(12) United States Patent
de Almeida et al.

(10) Patent No.: US 12,083,977 B1
(45) Date of Patent: Sep. 10, 2024

(54) ACTIVE BUCKLING FRAME RAIL

(71) Applicant: Zoox, Inc., Foster City, CA (US)

(72) Inventors: Reginaldo Alves de Almeida, Foster City, CA (US); Alexandre Nunes, San Carlos, CA (US); Fabricio Cesar Oda, Dublin, CA (US)

(73) Assignee: Zoox, Inc., Foster City, CA (US)

( * ) Notice: Subject to any disclaimer, the term of this patent is extended or adjusted under 35 U.S.C. 154(b) by 17 days.

(21) Appl. No.: 17/876,790

(22) Filed: Jul. 29, 2022

(51) Int. Cl.
*B60R 21/0136* (2006.01)
*B60R 19/40* (2006.01)
*B60R 21/01* (2006.01)

(52) U.S. Cl.
CPC .......... *B60R 21/0136* (2013.01); *B60R 19/40* (2013.01); *B60R 2021/01013* (2013.01)

(58) Field of Classification Search
CPC .... B62D 21/152; B60R 21/0136; B60R 19/40
See application file for complete search history.

(56) References Cited

U.S. PATENT DOCUMENTS

| | | | | |
|---|---|---|---|---|
| 7,721,837 B1 * | 5/2010 | DeVeau | .................. | B60R 21/02 |
| | | | | 180/274 |
| 11,046,266 B1 * | 6/2021 | Christensen | .......... | B60W 30/08 |
| 2005/0012317 A1 * | 1/2005 | Taya | ..................... | B62D 21/15 |
| | | | | 180/274 |
| 2022/0105888 A1 * | 4/2022 | Crinklaw | .............. | B60R 19/483 |

FOREIGN PATENT DOCUMENTS

| | | | | |
|---|---|---|---|---|
| AU | 2020471764 A1 * | 5/2023 | ............. | B60R 19/26 |
| CN | 113474208 A * | 10/2021 | ............ | B60L 3/0007 |
| DE | 102004036836 A1 * | 3/2006 | ............. | B60R 19/28 |
| DE | 102004055402 A1 * | 5/2006 | ......... | B60R 21/0136 |
| DE | 102022128877 A1 * | 5/2023 | ............. | B60R 19/00 |
| EP | 1498343 A2 * | 1/2005 | ............. | B62D 21/15 |
| EP | 3170702 A1 * | 5/2017 | ............. | B60R 19/04 |
| GB | 2022891 A * | 12/1979 | ............. | B60K 28/14 |
| WO | WO-2006012816 A1 * | 2/2006 | ....... | B60R 21/01332 |
| WO | WO-2006012817 A2 * | 2/2006 | ....... | B60R 21/01332 |
| WO | WO-2022075971 A1 * | 4/2022 | ............. | B60R 19/26 |

* cited by examiner

*Primary Examiner* — Nicole T Verley

(74) *Attorney, Agent, or Firm* — Lee & Hayes, P.C.

(57) ABSTRACT

An active buckling system for a vehicle including a force generator. The active buckling system includes the force generator that at least partially weakens a frame associated with the vehicle. The active buckling system may induce a buckling of the frame during a collision. The active buckling system may further reduce a longitudinal frame compression distance between a front of the vehicle and a cabin, associated with absorbing an impact from the collision, at least in part due to the inducing of the buckling of the frame.

11 Claims, 8 Drawing Sheets

ACTIVE BUCKLING FRAME RAIL

BACKGROUND

Vehicles often have a crumple zone (e.g., crush zone, crash zone, crash structure, etc.) that serves as a structural safety feature to increase the time over which a change in velocity, and consequently momentum, occurs from the impact of a collision. Crumple zones work by managing crash energy and increasing the time over which the deceleration of the occupants of the vehicle occurs, while also preventing intrusion into or deformation of the passenger cabin. As such, crumple zones are designed to protect vehicle occupants against injury. Conventional crumple zones attempt to reduce the effects of collisions, often by providing large distances (e.g., a longer crumple zone structure) to increase the time over which to absorb the crash energy. However, conventional crumple zones may not provide sufficient protection to vehicle occupants during certain collision conditions.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
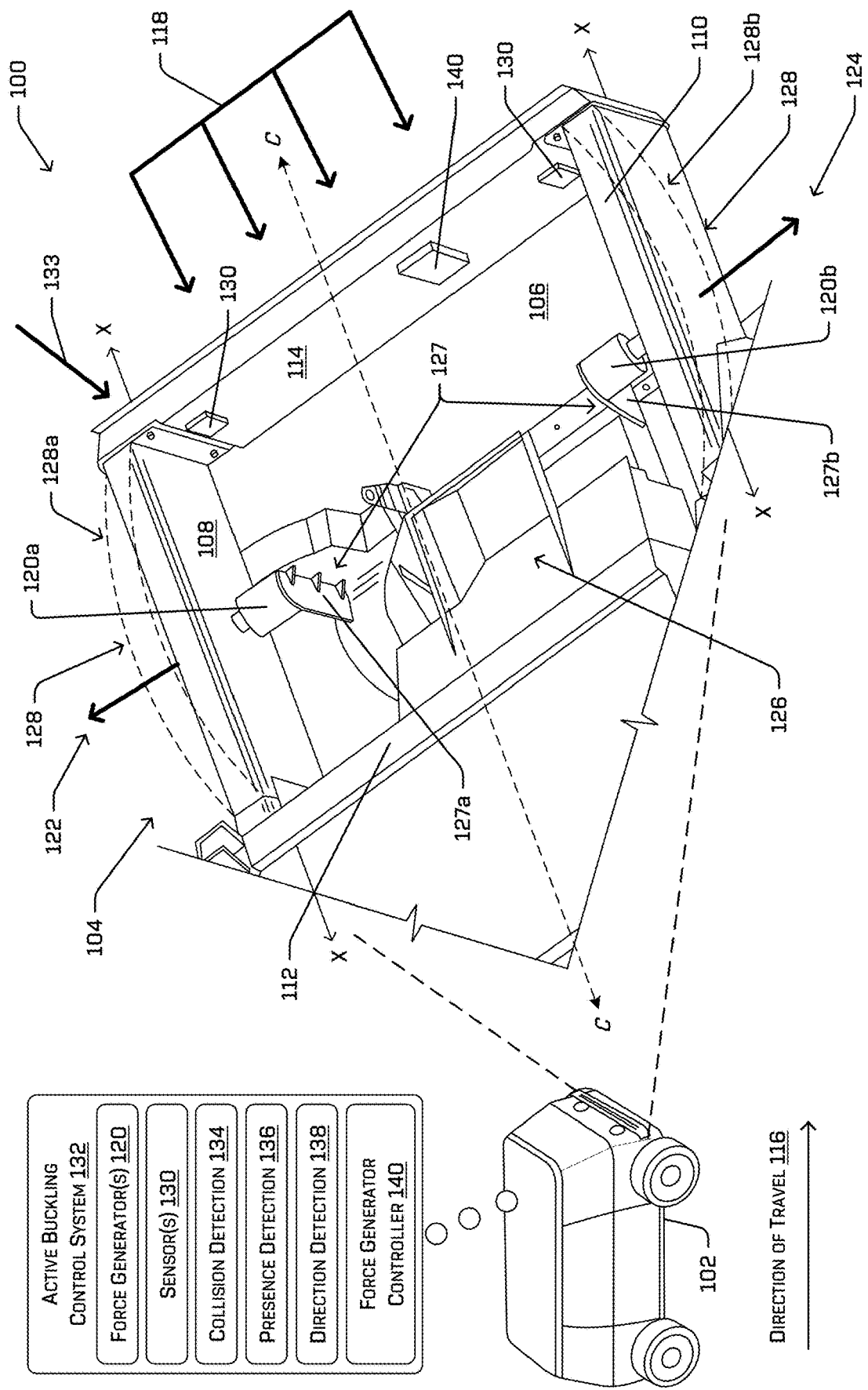
FIG. 1 is a cutaway perspective view of an example vehicle frame illustrating an example implementation of an active buckling system.

As mentioned above, conventional vehicle frames for crash protection, such as crumple zones, crash structures, or the like, have focused on increasing the time over which crash energy is absorbed. However, some vehicle designs and/or types of collisions may not provide enough protection to occupants. For instance, longitudinal rails of conventional frames can include crumple or crush zones that crush over a length, to absorb energy from an impact, particularly, a head-on impact (e.g., along the longitudinal direction). However, these conventional members require relatively long lengths to absorb higher-energy crashes. Thus, in vehicles with relatively short overhangs (e.g., a length that extends beyond a wheelbase at the front and/or rear and/or a length separate from a cabin at the front and/or rear), these conventional structures may not sufficiently protect occupants from injury. Aspects of this disclosure provide improved systems, devices, and techniques for occupant protection.

In aspects of this disclosure, a vehicle includes a frame. In further aspects of this disclosure, the vehicle includes a passenger compartment associated with the frame. In examples, the frame includes a first frame member and a second frame member. For example, the first frame member and the second frame member may extend along a longitudinal direction of the vehicle while they may also be spaced from each other in a lateral direction. For example, the first frame member and the second frame member may provide protection to the vehicle and its occupants during a collision event.

Aspects of this disclosure include actively inducing buckling to the frame, e.g., to redirect some of the energy from the collision event via the first frame member and/or the second frame member. As detailed herein, inducing buckling may result in a smaller longitudinal displacement of frame members, e.g., the first frame member, second frame member during a collision event, as compared to deformation caused by pure compression in conventional systems of the same length. Conventional techniques that rely on pure compression of the frame and/or frame members may require a longer compression distance than a length of a crash zone of the vehicle, e.g., resulting in the frame and/or members on the frame potentially impinging on the passenger cabin. However, by inducing buckling, forces resulting from a collision event are redirected, e.g., laterally, resulting in less displacement of the frame in the longitudinal direction.

In aspects of this disclosure, an active buckling system (e.g., a vehicle safety system) may be selectively activated to induce buckling to the frame, in response to a triggering event, while maintaining structural integrity under normal conditions and/or in the absence of the triggering event. For example, active buckling systems according to this disclosure may allow for increased frame stiffness during normal operation of the vehicle, but for controlled buckling during an impact. In contrast, some conventional, passive buckling systems, included purposely weakened frames and/or elaborate frame designs. Such passive systems may have reduced structural integrity in comparison to an active buckling system. Moreover, the active buckling systems detailed herein may only need additional components, e.g., force generators, obviating the need for changing manufacturing processes, redesigning the frame system, or the like.

The active buckling systems of this disclosure may also allow for collision mitigation in a smaller vehicle footprint. For example, as noted above, some vehicles may have limited overhang, e.g., to facilitate a larger passenger space, a smaller vehicle footprint, a larger wheelbase, and/or the like. Conventional frame systems may be unsafe in such small areas, e.g., because they require a relatively large crumple or crash zone. Active buckling systems like those described herein may allow for improved collision mitigation in a relatively smaller area, as in vehicles with such smaller overhangs. Aspects of this disclosure include associating one or more force generators with the frame. In some instance, a first force generator can be associated with the first frame member and the second force generator can be associated with the second frame member. The force generators may be configured to apply forces to the first frame member and/or to the second frame member when a collision event is detected. For example, the force generators may be configured to apply lateral forces that initiates buckling of the associated frame members and/or places the associated frame in a position to more readily deflect and/or more easily deflect in a lateral direction. In some examples, the force generator is placed such that, when actuated in response to a collision event, is activated to at least partially weaken and/or induce buckling of the first frame member and the second frame member. For example, the force generator may be incorporated into the frame and when actuated, applies a force in a lateral direction.

In aspects of this disclosure, the one or more force generators may act upon ends of the first frame member and the second frame member. For example, the first frame member may have a first front end and a first rear end. Additionally, the second frame member may have a second front end and a second rear end. The first force generator may act upon the first front end of the first frame member, at least partially destroying a portion of the first front end that may fixedly attach the first frame member to another frame member. In some instances, the first force generator may be integrated into a fastener that is used to couple frame members relative to each other. For instance, the first force generator can be a pyrotechnic fastener, explosive bolt, or the like that can be triggered, e.g., to deform or at least partially destroy the fastener, thereby weakening or destroying the coupling between the member. In such examples, at least partial destruction of one or more ends of the first frame member and/or the second frame member may change a configuration of the first frame member and/or the second frame member as attached to another frame member. For example, where at least a portion of the first front end is destroyed, the first frame member may be pivotably attached to another frame member and further configured to swing outward. Other examples of reconfiguring the first frame member and/or the second frame member are contemplated.

In aspects of this disclosure, an active buckling system can include a controller that controls activation of the force generators. For example, the controller can receive information from a collision detection system and/or other computing systems associated with the vehicle to determine an event including a collision event, a perceived potential collision event, additional information about the vehicle, and/or the like. For example, the event may include a perceived potential collision event which may indicate a likelihood of a collision event at a time in the future. In such instances, the active buckling system may by controlled and/or coordinated by the controller, based at least in part on information relating to the perceived potential collision event, to activate accordingly. Based on the event, the controller can control the activation of the force generators.

In some aspects of this disclosure, the controller may also determine a state of the vehicle, e.g., vehicle occupancy, occupant seating and/or standing orientations, etc. For instance, one or more occupant detection sensors can be associated with seats in the vehicle and configured to generate sensor data used to determine whether the vehicle is occupied. For example, it may be unnecessary (and/or undesirable) to actuate the force generator under certain states of the vehicle, e.g., where the occupants of the vehicle have been dropped off as determined by one or more occupant detection sensors, internal cameras, entrance/exit counters, and/or a combination thereof.

In example aspects of this disclosure, different types of force generators may be used to induce buckling of the frame and/or at least partially weaken the first frame member and/or the second frame member. For example, the force generator may include an electrochemical explosive, e.g., a pyrotechnic device and/or explosive charge, configured to directly induce buckling through controlled deformation of the frame, to weaken key areas of the frame, and/or reconfigure the frame at attachments to direct and/or allow the frame to deform. In some other examples, the force generator may include one or more electromagnetic field generators (e.g., an electromagnetic inductor (EMI) and/or electromagnetic capacitor (EMC) devices) configured to induce buckling on the frame. For instance, the electromagnetic field generator may produce electromagnetic fields with a resultant force vector being applied to the frame. In some further examples, the force generator may be a mechanical force generator and direct (e.g., mechanically transfer) it to areas of the frame as described herein to induce buckling. For example, the force generator may be configured to transfer energy from a controlled explosion, via a mechanical device and/or a physical device, into specific areas of the frame to induce buckling and/or place frame members in a state wherein the collision will result in buckling of the frame, instead of compression. Additionally, force generators utilizing mechanical transference of energy may provide additional benefits such as eliminating the controller to actuate the force generator based at least in part on the detection of a collision event, perceived collision event, and/or the like.

In aspects of this disclosure, the force generators can be placed at selected locations along the frame to result in a desired buckling or other load (re)distribution. In some examples, the location of the force generators may be based at least in part on the type of frame member and/or the manner in which the frame member is secured to the vehicle. In some examples, the force generators may be placed substantially centrally along the length of the frame member to be buckled. In other examples, one or more force generators may be placed proximate ends of the members to be buckled. In still further examples, the force generators may be positioned to deform, destroy or otherwise affect a coupling of the frame members. In examples, actuation of the force generators may alter an effective length of the frame, the first frame member, and/or the second frame member. In some further examples, the frame may include pre-weakened areas and/or actively weakened areas to further induce buckling and/or reduce a force necessary to induce buckling. For example, the frame, the first frame member, and/or the second frame member may include scores (e.g., cutouts) at locations to provide predetermined points of failure designed to induce buckling and/or reduce a force required to induce buckling.

In some instances, the vehicle may include a planning system, a collision detection system, etc. that can determine change in velocity of the vehicle, a predicted change in velocity of the vehicle, a collision, or a predicted collision probability in view of one or more objects based on sensor data received by one or more sensors and generate a corresponding trigger signal that is received by the active buckling control system. The sensor data may include data associated with the vehicle and/or one or more objects in the environment of the vehicle. For example, the sensor data may include information associated with physical characteristics, a location, and/or a movement associated with the vehicle and the object(s). Additional information associated with the object(s) may be determined based on the sensor data, such as a position, a velocity, an acceleration, a direction, a size, a shape, a type of the object, etc. Based on the sensor data, trajectories of the vehicle and/or the object may be determined for use in determining the collision probability. Generally, the probability may represent a likelihood, or risk, of the change in velocity of the vehicle, a predicted change in velocity of the vehicle, a collision, or a predicted collision occurring. In most circumstances, the vehicle can maneuver to safely avoid the collision.

In aspects of this disclosure, in instances where avoidance is impossible and the probability of a change in velocity of the vehicle, a predicted change in velocity of the vehicle, a collision, or a predicted collision is greater than a threshold probability, the planning system and/or collision detection system, for example, may determine that a change in velocity of the vehicle or a collision is predicted to occur. In some instances, whether the change in velocity or the collision is predicted to occur may be based at least in part on determining that the change in velocity or collision is imminent (e.g., within a certain amount of time). Based on this determination, the planning system and/or collision detection system, for example, may communicate with other system(s) of the vehicle such as the active buckling control system to protect the occupant. In some instances, activation of the active buckling control system may be performed prior to a change in velocity or a collision (e.g., precollision), during a change in velocity, during a collision, and/or after a change in velocity or collision (e.g., post-collision). In instances where the active buckling control system is engaged prior to the change in velocity or collision, the collision detection system and/or the planning system, for example, may communicate with systems of the vehicle in advance and with enough time to permit engagement of the force generators or other safety device(s).

In example aspects of this disclosure, techniques described herein can selectively actuate and/or activate force generators based at least in part on the information just discussed. For example, responsive to a collision event, a force generator may actuate an application of a force to directly and/or indirectly induce and/or influence buckling of the frame, first frame member, and/or second frame member.

The techniques and systems described herein may be implemented in a number of ways. Example implementations are provided below with reference to the figures.

FIG. 1 is a cutaway perspective view illustrating an example implementation of an active buckling system 100 associated with a vehicle 102, according to aspects of this disclosure. For the purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially- or fully-autonomously controlled.

The example vehicle 102 may be any configuration of vehicle, such as, for example, a van, a sport utility vehicle, a cross-over vehicle, a truck, a bus, an agricultural vehicle, or a construction vehicle. The vehicle 102 may be powered by one or more internal combustion engines, one or more electric motors, any combination thereof, and/or any other suitable power sources. Although the example vehicle 102 has four wheels, the systems and methods described herein may be incorporated into vehicles having fewer or a greater number of wheels, tires, and/or tracks. The example vehicle 102 may have four-wheel steering and may operate generally with equal performance characteristics in all directions.

As shown in FIG. 1, the vehicle 102 includes a frame 104 defining a volume 106 of the vehicle 102. More specifically, in the illustrated example, the frame 104 includes a first longitudinal frame member 108 (e.g., a first longitudinally-extending member) and a second longitudinal frame member 110 (e.g., a second longitudinally-extending member) extending generally in a longitudinal direction of the vehicle 102 (e.g., along the X-direction in FIG. 1). The frame 104 further includes a first lateral frame member 112 and a second lateral frame member 114. In the illustrated example, the first longitudinal frame member 108 and the second longitudinal frame member 110 extend between the first lateral frame member 112 and the second lateral frame member 114. For instance, first ends of the longitudinal frame members 108, 110 may be coupled to the first lateral frame member 112 and second, opposite ends of the longitudinal frame members 108, 110 may be coupled to the second lateral frame member 114. In some examples, the first lateral frame member 112 may be associated with a passenger compartment or cabin of the vehicle 102, and/or the second lateral frame member 114 may be associated with a leading (or trailing) end of the vehicle 102. Although not illustrated in FIG. 1, any or all of the frame members 108, 110, 112, 114 may be configured to mount components and/or features of the vehicle 102, including but not limited to additional frame members, body panels, and/or other vehicle members.

The first and second longitudinal frame members 108, 110 may be spaced by a width of the vehicle 102, a width of the frame 104, or some other width. Similarly, the first and second lateral frame members 112, 114 can extend from a passenger compartment to a longitudinal end of the vehicle 102 or may be otherwise spaced. In the example of FIG. 1, the frame members 108, 110, 112, 114 define extents of the volume 106. For example, the volume 106 may be sized to receive one or more components of the vehicle, including but not limited to a motor, a battery, computing hardware, and/or other components. Although the volume 106 is generally shown and described as being bounded by certain surfaces, structures, or the like, the volume 106 may be any volume at least partially between the first longitudinal frame member 108 and the second longitudinal frame member 110 and/or extending longitudinally between the first lateral frame member 112 and the second lateral frame member 114. As may be appreciated, the frame 104, the volume 106, and other aspects of the vehicle 102 are shown for example only.

In some aspects of this disclosure, the volume 106 may at least in part define a crumple zone or crush zone. More specifically, the first longitudinal frame member 108 and the second longitudinal frame member 110 have lengths, e.g., first and second lengths (which may be the same length) that generally define an overhang, an overhang portion, an overhang area, and/or a distance corresponding to an amount of impact that may be absorbed during a collision event. Stated differently, a head-on crash event (e.g., a collision in the X-direction) can cause the second lateral frame member 114 to move toward the first lateral frame member 112. The length of the longitudinal members 108, 110 (and/or the depth, in the X-direction, of the volume 106), may have a direct impact on the distance that the second lateral frame member 114 (and components in the volume 106), can travel before impacting the first lateral frame member 112 and/or otherwise affecting the passenger compartment.

In conventional frames, the longitudinal frame members 108, 110 are selected to have an overhang and/or a length that facilitates desirable crash outcomes, e.g., by elongating the volume 106 in the X-direction. However, in some examples, the vehicle 102 may be configured to reduce an overall footprint of the vehicle 102 while maximizing passenger space. For instance, it may desirable to reduce the overhang and/or the length of the longitudinal frame members 108, 110, while still achieving safe outcomes in a collision event. Also in some examples, the vehicle 102 may be configured for bi-directional travel, such that when the vehicle is travelling in a direction of travel 116 (from left to right in FIG. 1) the second longitudinal frame member 114 of the vehicle 102 is at the leading end of the vehicle 102, and when the vehicle 102 is travelling in a direction opposite the direction of travel 116, the second lateral frame member 114 is disposed at the trailing end of the vehicle 102. These example characteristics may facilitate greater maneuverability, for example, in small spaces or crowded environments, such as parking lots and urban areas. Because the vehicle 102 may not have a dedicated "front" end, the vehicle 102 may have substantially the same configuration at either end. For instance, the illustrated members of the frame 104 may be identical to members at an opposite end of the vehicle 102. At least in part because of the bi-directionality, it may be desirable to reduce the size of the volume 106, e.g., to reduce the overall overhang and/or length of the vehicle 102.

In the example of FIG. 1, the longitudinal frame members 108, 110 are illustrated as beams or similar elongated structured. In other examples, the frame members 108, 110 may be integrated into a body the vehicle 102. For example, the vehicle 102 may be constructed as a single and/or substantially single formed shell including, for instance, a carbon fiber shell. The body may have sufficient rigidity to act as the longitudinal frame members. In other examples, the body may be mounted to or otherwise formed on one or more sides of the vehicle 102 in a singularly formed, extending member. In other aspects of this disclosure, the longitudinal frame members 108, 110 may be configured as additions to the vehicle 102. For example, the longitudinal frame members 108, 110 may be attached to one or more sides of the vehicle 102, e.g., extending laterally outwardly from the vehicle 102.

In aspects of this disclosure, the overall overhang and/or distance corresponding to an amount of impact that may be absorbed during a collision event of the vehicle 102 is shown as extending in the X-direction, however other configurations are contemplated. For example, the overall overhang and/or distance may extend along one or more sides of the vehicle 102 in a direction perpendicular to the X-direction. In such instances, the vehicle 102 may reduce and/or absorb forces associated with a collision event at one or more sides of the vehicle 102. In other aspects of this disclosure, the application of the overall overhang and/or distance is shown as applied to a passenger vehicle, however other configurations and/or applications are contemplated. For example, the overall overhang and/or distance configured to collapse and/or absorb energy associated with a collision event may be applied to trains, buses, trolleys, etc.

With specific reference to the example of FIG. 1, when the vehicle 102 travels in the direction of travel 116, the frame 104 is at the leading end of the vehicle 102. As also illustrated in FIG. 1, when travelling in the direction of travel 116, should the vehicle 102 collide with or otherwise impact an object at the leading end, e.g., proximate the second lateral frame member 114, the frame 104 may experience different forces. Specifically, as depicted in FIG. 1, the second lateral frame member 114 may experience a collision force 118, generally in the longitudinal, X-direction. While the collision force 118 is depicted as extending substantially along the X-direction, other oblique angles are contemplated. In the illustrated arrangement, the collision force 118 can cause an associated force on the first frame member 108 and the second frame member 110, e.g., via the second lateral frame member 114. As such, the first frame member 108 and the second frame member 110 may be selectively configured and/or induced to buckle to actively absorb and/or otherwise reduce the collision force 118 experienced by the vehicle 102. For example, the vehicle 102 may include a short overhang, as described and alluded to herein, that includes and/or defines the volume 106. In such instances, the vehicle 102 may benefit from structural integrity associated with a frame that is not design for buckling while additionally benefiting from configuring and/or inducing the frame to buckling under certain conditions and/or events. Further, the vehicle 102 may benefit from having a shorter overhang and/or the first frame member 108 and the second frame member 110 shortened.

More specifically, the active buckling system 100 of the FIG. 1 includes a first force generator 120a and a second force generator 120b (collectively, "the force generator(s) 120") disposed in the volume 106 of the vehicle 102. In the example of FIG. 1, the first force generator 120a is associated with the first longitudinal frame member 108 and the second force generator 120b is associated with the second longitudinal frame member 110. In some examples, the force generator(s) 120 may be coupled to the longitudinal frame members 108, 110 and/or coupled to one or more other members of the vehicle 102, e.g., to be disposed in proximity of the longitudinal frame members 108, 110. The force generator(s) 120 may further be configured to be coupled to the first frame member 108 and the second frame member 110 proximate to a center of the first frame member 108 and the second frame member 110. In some further examples, the force generator(s) 120 may be one or more devices.

The first force generator 120a is configured to apply a first force 122 to the first frame member 108, and the second force generator 120b is configured to apply a second force 124 to the second frame member 110. As illustrated in FIG. 1, the first force 122 causes a first deflection 128a (depicted with curved dashed lines) of the first longitudinal frame member 108. Similarly, the second force 124 causes a second deflection 128b (also depicted with curved dashed lines). The first deflection 128a and the second deflection 128b (collectively, "the deflections 128") may, in combination with the collision force 118 and/or in isolation, induce the first frame member 108 and the second frame member 110 to buckle. More specifically, by causing the normally longitudinally-extending frame members 108, 110 to deflect, at least a portion of the collision force 118 is re-directed laterally outwardly. By redirecting some of the collision force 118 in this manner, the impact in the longitudinal direction is reduced, thereby reducing the compressive forces on the longitudinal frame members 108, 110. Although the example of FIG. 1 shows that the deflections 128 result in bowing of the longitudinal frame members 108, 110, this bowing may not be required in other examples.

In some examples, the force generator(s) 120 may be configured to apply forces to one or more ends of the frame members. For example, the first force generator 120a may be configured to apply the first force 122 to an end of the first frame member 108 where it is coupled to the second lateral frame member 114. In such instances, the first force generator 120a may be configured to at least partially decouple the first frame member 108 and the second lateral frame member 114. The partial decoupling may create a pivot coupling between the first frame member 108 and the second lateral frame member 114. In such instances, the first frame member 108 may be more likely to buckling under the collision force 118 as the pivot may reduce an effective resistance to buckling. An effective resistance to buckling may be defined as an amount of force and/or energy that a member may be axially loaded with prior to buckling. While a single force generator is described, more force generators are contemplated. For example, two or more of the force generator(s) 120 may be used in combination. Further, while a single pivot creation has been described, more changes to an end condition of a frame member is contemplated. For example, two or more of the force generator(s) 120 may be applied to alter the end condition of the first frame member 108 to create pivots on both ends.

In some further examples, the force generator(s) 120 may be used in conjunction with the collision force 118. For example, the force generator(s) 120 may configure the first frame member 108 and the second frame member 110, respectively, to buckle under a load from the collision force 118. In such instances, the force generator(s) 120 may apply forces, manipulate the frame members, and/or the like to induce buckling of the frame rails in combination with the collision force 118. For example, the first force generator 120a may apply the first force 122 to the first frame member 108 which may cause the first deflection 128a. In some examples, the first force 122 may not be sufficient to induce the first deflection 128a, on its own. However, the first force 122 may create a force that, in combination with the collision force 118, results in the first deflection 128a and causes the first frame member 108 to buckle. For example, the first deflection 128a may be used to direct and/or otherwise compromise the first frame member 108 in an intended direction while the collision force 118 may overcome any remaining resistance(s) within the first frame member 108 and induce the first frame member 108 to buckle. As described herein, the first force generator 120a may change an end condition of the first frame member 108. In such instances, the effective resistance to buckling may be reduced to an amount less than the force and/or energy of the collision force 118. Where the effective resistance to buckling has been reduced below the collision force 118, the first frame member 108 may be induced to buckle.

When activated, the force generator(s) 120 at least partially compromise the first frame member 108 and/or the second frame member 110. Accordingly, and continuing the example discussed above of a collision event with the vehicle 102, the deflections can provide increased energy absorption of the collision force 118. Thus, the frame can absorb more of the collision force 118 and/or reducing the longitudinal distance required to absorb an impact during a collision event. As such, the first frame member 108 and the second frame member 110 may be shortened in dimension along the X-direction and still reduce and/or eliminate harm to occupants and/or damage to the vehicle associated with the collision force 118.

In the illustrated example, the first force generator 120a and/or the second force generator 120b may be coupled to an anchoring structure 126 via a first mounting member 127a and a second mounting member 127b (collectively, "the mounting members 127"), respectively. The mounting members 127 may be made of any suitable material to resist any reactionary forces generated by the force generators 120 and/or to fixedly couple the force generators 120 to the anchoring structure 126. The anchoring structure 126 may be separate from the first and/or second longitudinal frame members 108, 110. In addition to positioning the force generator(s) 120 to apply the forces 122, 124, the anchoring structure 126 may provide a resistive force to the first force 122 and/or the second force 124. For example, the first force generator 120a may generate the first force 122 upon the first frame member 108. As such, an equal and opposite force can result and act upon the first force generator 120a. In such examples, the anchoring structure 126 may provide a resistive force by anchoring the first force generator 120a and ensuring that all or a substantial amount of the first force 122 generated acts upon the first frame member 108. The anchoring structure 126 may include a subframe, motor mounts, and/or the like of the vehicle. Additionally, the foregoing example as applied to the first force generator 120a is merely illustrative of an application of the anchoring structure 126 and may apply to the second force generator 120b and/or the force generator(s) 120.

The vehicle 102 can also include an active buckling control system 132 configured to control aspects of the active buckling system 100. Specifically, the active buckling control system 132 includes the force generators 120, one or more sensors 130, a collision detection component 134, a presence detection component 136, a direction detection component 138, and/or a force generator controller 140.

In some example implementations, the vehicle 102 can be configured such that (all of) the force generators 120 are configured to activate in response to a collision event, as discussed above. In still further examples, however, and as discussed further below, aspects of this disclosure may also facilitate selectively activating (fewer than all of) the force generator(s) 120 based on additional information about the vehicle 102. For example, the vehicle 102 is illustrated as including the sensors 130. Generally, the sensors 130 may generate sensor data used by the active buckling control system 132 to determine whether to activate the force generator(s) 120. For example, the sensor(s) 130 can include sensors configured to detect objects in proximity to the vehicle 102 and/or conditions associated with the vehicle. For example, the sensor(s) 130 can include radar sensors, lidar sensors, imaging sensors, occupant detection sensors, cargo detection sensors, and/or one or more other sensors.

In some examples, the active buckling control system 132 may be configured to cause the force generator(s) 120 to activate before, during, and/or after the reduction in velocity of the vehicle 102 due to braking and/or the collision. In examples, the active buckling control system 132 may be configured to cause activation of the force generator(s) 120 before a change in velocity or collision event occurs. In examples, activation of the force generator(s) 120 can be at time of detection of a braking or of a collision, or of a predicted collision, at time equal −400 ms. In examples, the activation occurs at the time of a change in velocity or collision event at time equal to 0 ms.

In examples, full activation can occur quickly. In examples, activation occur from time at 0 ms to time 10 ms. In examples, full activation of the force generator(s) 120 may be designed to occur in 10 ms. In examples, activation can be only partial activation. In examples, activation can be gradual. In examples, activation can be delayed. In examples, the time to deploy may be shorter or longer than 10 ms.

In examples, the active buckling control system 132 may be configured to control activation and/or rate of activation of one or of the force generator(s) 120 based on a set of activation parameters. Rate of activation refers to the speed at which one or more of the force generator(s) 120 are activated. Activation refers to the full or partial activation of the force generator(s) 120. In examples, where the vehicle 102 is configured to have two or more of the force generator(s) 120, activation may include the selective activation of one or more of the force generator(s) 120, the delayed activation of one or more of the force generator(s) 120 as compared to other of the force generator(s) 120, or any combination thereof. In examples, the active buckling control system 132 may control activation or deactivation of one or more of the force generator(s) 120.

In some aspects of this disclosure, an example set of activation parameters may include the vehicle 102 experiencing the collision force 118 at an oblique angle (e.g., an angle of attack) to the vehicle 102. For example, an angled collision force 133 may contact the vehicle 102 at substantially near an end of the first frame member 108. Additionally, the angled collision force 133 may be at an angle relative to a centerline, ('. In such instances, the vehicle 102 may experience forces at different magnitudes in different locations and/or at different times. For example, the angled collision force 133 may be closer in proximity to the first frame member 108 which may result in the first frame member 108 experiencing forces associated with the angled collision force at a greater magnitude than any forces experienced by the second frame member 110. Additionally, the first frame member 108 may experience any associated forces with the angled collision force 133 at an earlier time than the second frame member 110.

In aspects of this disclosure, the active buckling control system 132 may activate the force generator(s) 120 at different times and/or cause different individual of the force generator(s) 120 to generate different forces. For example, where the angled collision force 133 contacts the vehicle 102 at a location closer to the first frame member 108 than the second frame member 110, the active buckling control system 132 may activate the first force generator 120a before activating the second force generator 120b. In such instances, the first force generator 120a may be activated at a specific time to induce buckling in the first frame member 108 based at least in part on the angle and/or position of the angled collision force 133. In other examples, the active buckling control system 132 may adjust a magnitude of the first force 122 generated by the first force generator based at least in part on the angle and/or position of the angled collision force 133 and/or the collision force 118.

In still further aspects of this disclosure, the active buckling control system 132 may delay the activation and/or reduce the force generation of one or more of the force generator(s) 120. For example, the angled collision force 133 may place forces upon the first frame member 108 earlier than forces upon the second frame member 110. In such instances, the active buckling control system 132 may delay the activation of the second force generator 120b base at least in part on the set of activation parameters. The active buckling control system 132 may delay the second force generator 120b until a time that may correspond with a greater efficacy of inducing buckling in the second frame member 110. In some other examples, the angled collision force 133 may place high magnitude forces upon the first frame member 108 than upon the second frame member 110. In such instances, the active buckling control system 132 may reduce the first force 122 generated by the first force generator 120a and increase the second force 124 by the second force generator 120b. The first frame member 108 may experience a greater magnitude of force from the angled collision force 133, based at least in part on the set of activation parameters, and may thus require less magnitude of the first force 122 to overcome any resistance to buckling, in the first frame member 108, in combination with forces associated with the angled collision force 133. Accordingly or alternatively, the second frame member 110 may experience a lesser magnitude of force from the angled collision force 133 and may thus require a greater magnitude of the second force 124 to overcome any resistance to buckling, in the second frame member 110, in combination with forces associated with the angled collision force 133.

In further aspects of this disclosure, one or more characteristics of the collision force 118 may be determined from an angle of arrival, velocity, and/or location of the collision force 118 upon the vehicle 102 as described herein. The one or more characteristics may include magnitudes of force to be experienced in the longitudinal frame members 108 and 110, propagation timings of the magnitudes of force, associated vector forces from the collision force 118, etc. Determinations of the one or more characteristics of the collision force may be determined by one or more onboard components and/or systems of the vehicle 102. In other instances, the vehicle 102 may communicate the one or more characteristics of the collision force 118 to one or more external components, systems, and/or otherwise. Further, the one or more characteristics may be determined via look up tables, machine learning algorithms, computational programs, and/or the like.

The collision detection component 134, the presence detection component 136, the direction detection component 138, and/or the force generator controller 140 may be embodied as one or more computing components configured to perform functionality associated with the active buckling control system 132. Although illustrated separately, some or all aspects of the active buckling control system 132 may be combined.

The collision detection component 134 may include functionality to determine that the vehicle 102 is involved in a collision. Alternatively, or additionally, the collision detection component 134 may include functionality to determine that a collision is imminent. Without limitation, the collision detection component 134 can receive data about an acceleration (or deceleration) of the vehicle, about objects in the environment of the vehicle, from a prediction system configured to determine a likelihood of a collision with an object, and/or other types of data from other sources.

In some instances, an event probability, i.e. the probability of a change in velocity or collision, may be determined based on a predicted intersection between the vehicle 102 and an object via the collision detection component 134. The predicted intersection may be associated with a predicted location of the vehicle 102 and the predicted location of the object at a future instance in time. As discussed in detail herein, the vehicle 102 may include one or more system(s) that determines the event probability based on sensor data received by the sensors 130 of the vehicle 102, sensor(s) from other vehicles, sensor(s) associated with the vehicle, and so forth. Sensor data may include data associated with the vehicle 102 and the object, such as information associated with physical characteristics, a location, and/or a movement associated with the vehicle 102 and the object. Based on the sensor data, as well as the vehicle trajectory and/or the object trajectory, the vehicle systems (e.g., the active buckling control system 132, the collision detection component 134, etc.) may determine the event probability. The event probability may represent a likelihood, or risk, of an event or collision event between the vehicle 102 and the object. Additionally, in some instances, one or more system(s) may determine whether a change in velocity of the vehicle 102, a predicted change in velocity of the vehicle 102, a collision, or a predicted collision is imminent. Whether the change in velocity of the vehicle 102, a predicted change in velocity of the vehicle 102, a collision, or a predicted collision is imminent may be based on predicting that the change in velocity of the vehicle 102, a predicted change in velocity of the vehicle 102, a collision, or a predicted collision occurs within a certain amount of time (e.g., one second, two seconds, etc.). The presence detection component 136 includes functionality to determine the presence of objects in the vehicle 102. For example, the presence detection component 136 can receive data from the sensor(s) 130 and, based at least in part on that data, determine whether one or more seats in the vehicle 102 are occupied. The presence detection component 136 can also, or alternatively, receive data generated by the sensor(s) 130 and, based at least in part on that data, determine the seats that have cargo thereunder. In examples, the presence detection component 136 may make a first binary determination of whether a given seat has an occupant and/or a second binary determination of whether a given seat has stowed cargo associated therewith.

The direction detection component 138 includes functionality to determine a direction of travel of the vehicle 102. For instance, in the example discussed above, the direction detection component 138 can determine that the vehicle 102 is travelling in the direction of travel 116. The direction detection component 138 can determine the direction of travel 116 based at least in part on any one of sensor data, heading data, route planning data, map data, and/or other data. The direction detection component 138 can also, or alternatively, determine a direction associated with each of the seats and/or of the occupants of the seats. For instance, in the example of FIG. 1, the direction detection component 138 may determine that a first seat is a rearward-facing seat and that a second seat is a forward-facing seat. The direction a passenger faces relative to the direction of travel can influence the forces experienced by that passenger during a collision event.

The force generator controller 140 include functionality to activate one or more of the force generator(s) 120, that is, to cause the first force generator 120a to generate the first force 122 and/or to cause the second force generator 120b to generate the second force 124, as discussed above. In examples, the force generator controller 140 may receive data from one or more of the collision detection component 134, the presence detection component 136, and/or the direction detection component 138. For instance, the force generator controller 140 can cause activation of one or more of the force generator(s) 120 based at least in part on information from the collision detection component 134 indicating that a collision event has occurred or is imminent. In another example, the force generator controller 140 can cause activation of one or more of the force generator(s) 120 based at least in part on information from the presence detection component 136. For instance, the force generator controller 140 may activate the force generator(s) 120 under certain weight conditions associated with seats that have either cargo thereunder or that have occupants. In this example, if no cargo or occupant is associated with a seat, the force generator controller 140 may not activate and/or may reduce the first force 122 and the second force 124 generated by the force generator(s) 120, e.g., even with the collision event. In a still further example, the force generator controller 140 can cause activation of one or more of the force generator(s) 120 based at least in part on information from the direction detection component 138 indicating a direction of travel and/or an orientation of the seats. For instance, the force generator controller 140 can activate the force generator(s) 120 associated with the frame 104 on either end of the vehicle 102, e.g., the end of the vehicle 102 to contact the collision force 118.

As discussed above, the force generator(s) 120 may provide improved safety outcomes for occupants, e.g., by providing an improved cushion or barrier to reduce the collision force 118 that may be transferred to the vehicle 102, the passenger compartment of the vehicle 102, and/or any occupants. Of course, these are examples only, intended to demonstrate various functionality of the force generator controller 140. Other functionality is disclosed herein, and/or may be appreciated with the benefit of this disclosure.

Figure 2:
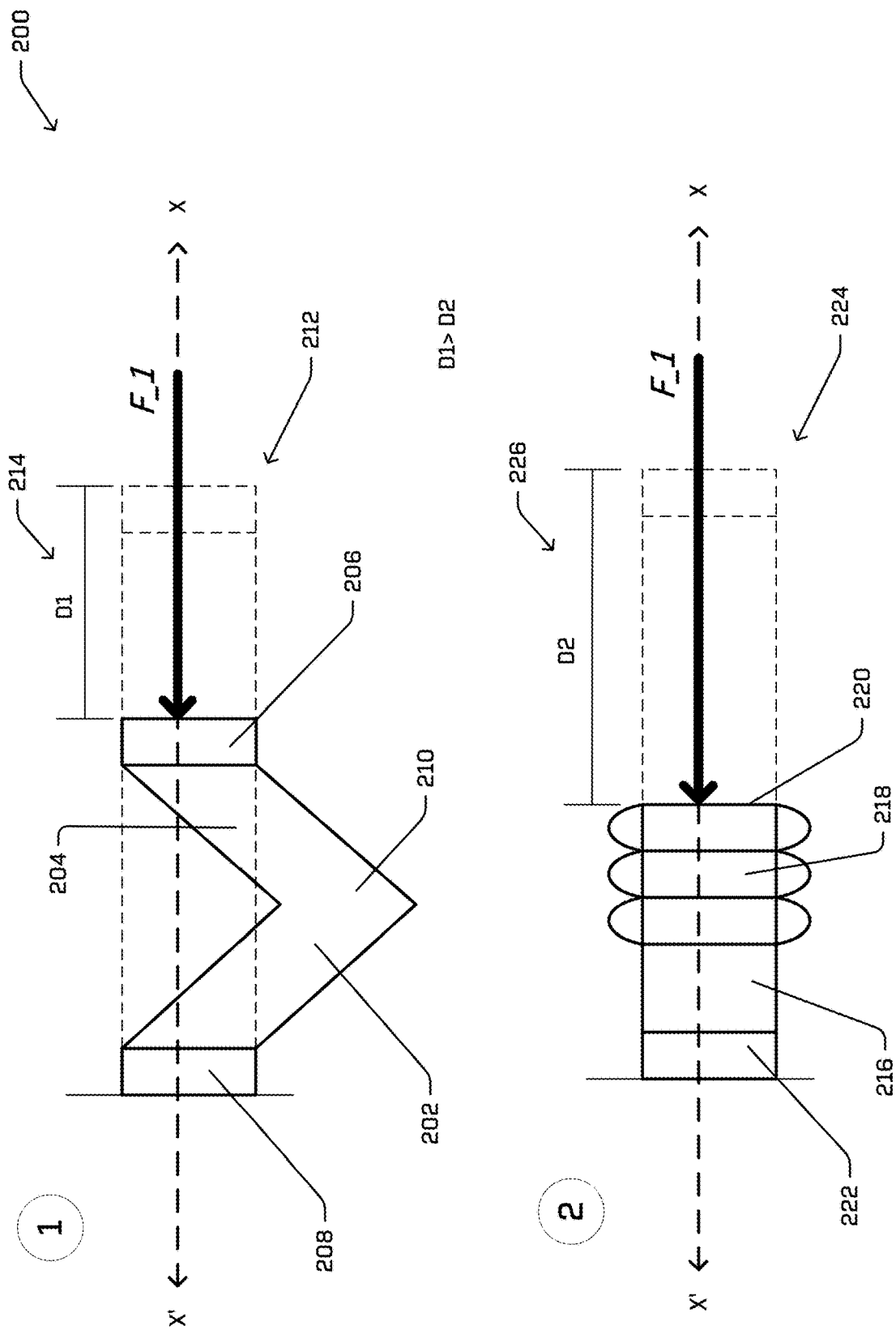
FIG. 2 is an example comparison illustrating example differences and associations between pure buckling and pure compression of the frame in response to application of a force along a line parallel to a longitudinal axis of the vehicle, illustrating additional aspects of this disclosure.

FIG. 2 is an example comparison 200 illustrating example differences between buckling, as achieved using techniques described herein, and pure compression of the frame, as in conventional frame systems, in response to application of a force along a line parallel to a longitudinal axis of the vehicle, illustrating additional aspects of this disclosure.

As depicted in FIG. 2, and denoted by the number "1," an example bent frame member 202 is bending (e.g., buckling) in response to application of a force F_1 (which may correspond to the collision force 118, discussed above) along a line parallel to a longitudinal axis X of the example bent frame member 202. The example bent frame member 202 includes a first deformable portion 204 extending between a first front end 206 and a first rear end 208. As shown, the first deformable portion 204 bends such that a bent portion 210 of the member deflects outward away from the longitudinal axis X. In some examples, this may result in a two-stage deformation, for example, such that an axial force acting on the first front end 206 of the bent frame member 202 in a direction substantially parallel to the longitudinal X causes a portion to axially crush (e.g., a first stage) prior to causing the first deformable portion 204 to bend (e.g., a second stage), for example.

In the bending (e.g., buckling) of example 1, in response to application of the force F_1, the bent frame member 202 bends from an unbent frame member 212 (as depicted by dashed lines). During this bending, the first front end 206 displaces a first distance 214. The first distance 214 may represent a distance traveled by the unbent frame member 212 to substantially dissipate the force F_1 acting on the first front end 206.

Also as depicted in FIG. 2, and denoted by the number "2," an example crushed frame member 216 is compressed (e.g., crushed) in response to application of the force F_1 along a line parallel to a longitudinal axis X of the example crushed frame member 216. The example crushed frame member 216 includes a second deformable portion 218 extending between a second front end 220 and a second rear end 222. As shown, the second deformable portion 218 compresses such that the second deformable portion 218 of the member compresses (e.g., crushes) inward along the longitudinal axis X.

However, in a pure crushing (e.g., compression) response to application of the force F_1, the crushed frame member 216 is compressed from an uncrushed frame member 224 (as depicted by dashed lines). As a result, the second front end displaces a second distance 226. The second distance 226 represents a distance traveled by the uncrushed frame member 224 to substantially dissipate the force F_1 acting on the second front end 220.

The first distance 214, associated with the bent frame member 202, is smaller than the second distance 226, associated with the crushed frame member 216. Stated differently, the bent frame member 202 dissipates the same force as the crushed frame member 216, but over a shorter displacement. For example, structural compromise of the crushed frame member 216 may increase the second distance 226 to effectively increase the time over which the force F_2 is absorbed. Conversely, elastic resistance potential, stored in the unbent frame member 212, may absorb more or the first force F_1 and/or increase the time over which the force F_1 is absorbed with the first distance 214 being shortened. This relationship may enable a relative shortening of the frame 104, e.g., of the first frame member 108 and the second frame member 110, while substantially maintaining the effectiveness of the frame 104. This may be useful, for example, in configuring a frame 104 for a vehicle having a relatively short volume 106 (e.g., a distance between the passenger compartment and the second lateral frame member 114 of the vehicle 102), which may provide design options for the vehicle. Other uses for the example frame 104 and/or the first frame member 108 and the second frame member 110 are contemplated. Application of the force generator(s) 120 to induce bending and/or buckling may be observed in FIG. 3.

Figure 3:
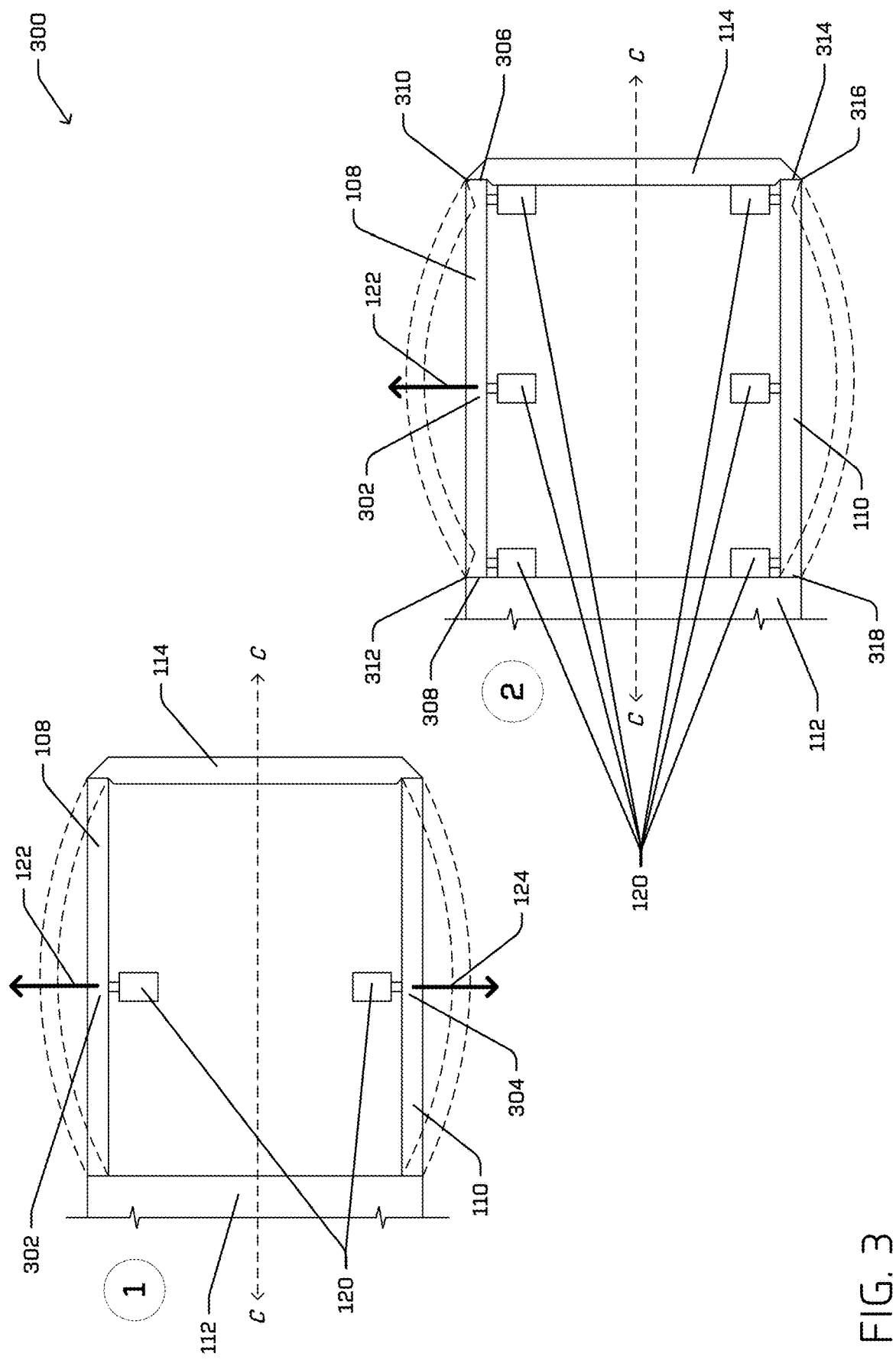
FIG. 3 is a top view of the vehicle frame illustrating an example force generator according to aspects of this disclosure.

As illustrated in FIG. 3, two example frames 300, depicted by the numbers "1" and "2," show varying configurations and numbers of the force generator(s) 120. The force generators 120 are shown schematically in FIG. 3 but may be any of a number of types of force generators configured to generate forces using any of a number of techniques.

The force generator(s) 120 may be configured to induce buckling in the first frame member 108 and/or the second frame member 110 utilizing a respective critical load of the first frame member 108 and/or the second frame member, respectively. A critical load refers to a threshold load (e.g., applied force threshold) to a member triggering failure of the member. For example, assuming a collision event results in the collision force being in the X- or longitudinal direction, the first frame member 108 and the second frame member 110 may behave according to the Euler column formula, reproduced here:

$$F = \frac{n * \pi^2 * E * I}{L^2} \quad (1)$$

where; F=allowable load, or the load at which the column can buckle under compression, n=factor accounting for end conditions, E=modulus of elasticity, L=length of column, and I=moment of inertia.

Some example end conditions and their respective factors are set forth in Table 1:

TABLE 1

Example Factors for the Euler Column Formula

| End Condition | Fixed on both ends | One end fixed; one end pivot | Pivoted on both ends | One end fixed; one end free |
|---|---|---|---|---|
| n | 4 | 2 | 1 | 0.25 |

Where all factors in the Euler column formula remain constant, it can be seen that the factor accounting for end conditions influences the allowable load differently. For example, where the first longitudinal frame member 108 and the second longitudinal frame member 110 are fixed on both ends, the allowable force may be four times as great as compared to an example where the first longitudinal frame member 108 and the second longitudinal frame member 110 are pivoted on both ends. As detailed further herein, the force generators 120 may be positioned to reduce the load at which buckling occurs, e.g., by providing a non-longitudinal force and/or by altering the end conditions.

As shown in "1," in FIG. 3, the force generator(s) 120 may be disposed proximate a first center 302 of the first longitudinal frame member 108 and proximate a second center 304 of the second longitudinal frame member 110. Placement of the force generator(s) 120 proximate the first center 302 and the second center 304 may reduce an amount of force, e.g., the allowable load, needed to induce bending and/or buckling of the first longitudinal frame member 108 and the second longitudinal frame member 110. For example, where the first longitudinal frame member 108 and the second frame member 110 are fixedly coupled to the first lateral frame member 112 and the second lateral frame member 114, the first longitudinal frame member 108 and the second longitudinal frame member 110 may be most likely to buckle or bow, under an applied force, at a location(s) proximate the first center 302 and/or the second center 304. In examples of this disclosure, the force generators 120 may apply the first force 122 and the second force 124 near the first center 302 and/or the second center 304, respectively, to assist with this buckling. In example 1 of FIG. 3, longitudinal frame members 108, 110 may be fixed to the lateral frame members 112, 114, e.g., as in the "fixed on both ends" condition described above, and the force generators 120 applying the first force 122 and the second force 124 to the first center 302 and the second center 304, respectively, can effectively reduce the allowable force required to induce buckling.

In some instances, the force generators 120 may be configurable, e.g., to increase or decrease the first force 122 and/or the second force 124. For example, the collision detection component 134 may estimate forces resulting from a collision, e.g., based on characteristics of the vehicle, characteristics of an object to be collided with, and/or other information, and further determine the first force 122 and/or the second force 124 that may induce buckling on the first longitudinal frame member 108 and the second longitudinal frame member 110. While FIG. 3 depicts the force generators 120 as being disposed proximate the first center 302 and the second center 304, this configuration is merely exemplary. Varying end conditions may present locations other than the first center 302 and the second center 304.

Referring now to example number "2" in FIG. 3, the force generators 120 may be disposed, for example, proximate the first center 302 of the first longitudinal frame member 108, as well as proximate a front end 306 and a rear end 308 of the first longitudinal frame member 108. For example, any additions of the force generators 120 may be positioned to apply forces proximate the front end 306 and/or the rear end 308 to induce buckling. In other examples, however, the force generators 120 may be configured to destroy a portion of the first longitudinal frame member 108 and/or destroy a coupling of the first longitudinal frame member 108 to the first lateral frame member 112 and/or the second lateral frame member 114. For instance, as in the Example 1 discussed above, the front end 306 and the rear end 308 of the first frame member 108 may be fixed to the first lateral frame member 112 and the second lateral frame member 114, respectively. Continuing the example, the force generators 120, in response to a collision event, may generate a force that deforms or destroys at least a portion of the first longitudinal frame member 108 proximate the front end 306. In some instances, the forces may effectively create a first pivot 310 at the front end 306. As such, the end condition constant may change from "4" to "2," and may reduce the allowable load before buckling occurs in half. Further, the force generators 120 may additionally or alternatively, apply the first force 122 proximate the first center 302 which may further induce buckling on the first frame member 108.

As also shown in FIG. 3, the force generators 120 may also be positioned to destroy and/or deform at least a portion of the rear end 308 of the first longitudinal frame member 108, e.g., to effectively create a second pivot 312 the rear end 308. When the force generators 120 create both the first pivot 310 and the second pivot 312, the end condition constant may effectively change from "4" to "1," and may reduce the allowable load before buckling occurs by a factor of four. Further, the force generators 120 may additionally or alternatively, apply the first force 122 proximate the first center 302 which may further induce buckling on the first frame member 108. In such examples, the force generator(s) 120 may reduce the first force 122 applied proximate the first center 302 commensurate with the factor of four reduction in the allowable load to induce buckling on the first frame member 108.

Example 2 of FIG. 3 also illustrates another example implementation. Specifically, the force generators 120 associated with the second frame member 110 can be configured to at least partially destroy or disengage a coupling at a second front end 314. For example, the force generator 120 disposed proximate the coupling of the second longitudinal frame member 110 and the second lateral frame member 114, upon activation, may at least partially sever the coupling, e.g., by shearing one or more pins, destroying a weldment, destroying a portion of the second longitudinal frame member 110, or otherwise decoupling the second longitudinal frame member (as shown in dashed lines) to create a third pivot 316. Using Equation (1) and Table (1) above, a mixed end condition, e.g., a fixed end and pivoted end, may have different resistances to pressure than other configurations. In the example 2, where only the second front end 314 is at least partially decoupled, the end condition constant may change from "4" to "2," which may effectively reduce the allowable load before buckling occurs by a factor of two. While the foregoing contemplates at least partial destruction of the coupling, alternatively, the second front end 314 and/or the second rear end 318 may be coupled to the second lateral frame member 114 and the first lateral frame member 112, respectively, using fasteners. As such, the force generator(s) 120 at these locations may be squibs, e.g., miniature explosive devices, configured to destroy at least a portion of the fasteners to create any number and/or combination of end conditions. It should also be noted that the examples described and alluded to, above and herein, should not be construed as limiting. For example, a number configurations of end condition manipulations exist and are contemplated. Additionally, manipulations made to the first frame member 108 may apply the same and/or similarly to the second frame member 110. Also, other configurations and/or techniques may become apparent to one skilled in the art in light of this disclosure.

As noted above, the force generators 120 may be any of a number of types of devices sufficient to generate a force to induce buckling and/or perform the techniques discussed above. In some examples, the force generators may include electrochemical explosive devices, e.g., pyrotechnic devices. In one non-limiting example, the force generators can include a chemical explosive coupled to an electronic heating member. In these examples, an electric current may be selectively passed through the heating member to generate heat sufficient to ignite the explosive. In these examples, the explosive can directly cause the forces (e.g., an explosive force) that facilitate buckling, or they may act on an intermediate member, e.g., a piston or the like, that applies the force to the frame members as described herein. Without limitation, the chemical explosive may include one or more of black powder, nitroglycerin, dynamite, blasting caps, squibs, and/or the like.

In some examples, the force generator(s) 120 may include a receptacle suitable for securing an amount of the explosive chemical. In some further examples, the force generator(s) 120 may also be configured to detonate primary and/or secondary explosives. For example, regarding a primary explosive, the force generator(s) 120 may supply a flame and/or spark to the explosive chemical in response to a collision event. Further, the supplying the flame and/or spark to the explosive chemical in response to a collision event may be controlled by the force generator controller 140 of the active buckling control system 132. In some further examples, the force generators 120 may be triggered directly by a collision event, e.g., via pressure and/or crash sensors coupled directly to the force generators 120. Such examples may obviate the collision detection component 134 and/or the force generator controller 140 of the active buckling control system 132.

In still further examples, the force generators 120 may further use a supplementary booster. For example, the force generator(s) 120 may use TNT as the explosive chemical. However, some initiators such as a shock tube, cannon fuse, or even conventional detonators may not provide sufficient shock to detonate the TNT. In such examples, in response to a collision event, the collision detection component 134 and/or force generator controller 140 may cause detonation of a primary charge (e.g., the supplementary booster) which may then deliver an explosive shockwave that is sufficient to detonate the secondary explosive chemical. The techniques and configurations described above are merely exemplary of a few of many different possible combinations. As such, these examples should not be construed as limiting. The force generator(s) 120 may include any number of combinations and/or techniques to accomplish producing a force to induce bending and/or buckling on the first frame member 108 and the second frame member 110.

The force generator(s) 120 may be designed to direct the forces generated toward the first frame member 108 and the second frame member 110. Typical explosive devices consist of a solid cylinder of explosive with a metal-lined conical hollow in one end and a central detonator, array of detonators, and/or detonation wave guide at the other end. Explosive energy is released directly away from (e.g., normal to) the surface of an explosive, so shaping the explosive can concentrate the explosive energy in the void. If the hollow is properly shaped (e.g., usually conically), the enormous pressure generated by the detonation of the explosive drives the liner in the hollow cavity inward to collapse upon its central axis. As such, the resulting collision may form and project a high-velocity jet of metal particles and/or a high-velocity shockwave forward along the central axis. In some further examples, the force generator(s) 120 may be designed and/or configured to direct a detonation wave, as the forces generated, toward the first frame member 108 and the second frame member 110. For example, the detonation wave may be a shockwave supported by a trailing exothermic reaction while the force generator(s) 120 may be configured to facilitate the exothermic reaction. The shockwave may involve a wave travelling through a highly combustible and/or chemically unstable medium, such as an explosive. As such, a chemical reaction of a medium may occur following the shockwave, and chemical energy (e.g., force) of the chemical reaction may drive the shockwave away from the chemical reaction. Further, the force generator(s) 120 may be configured to include an opening by which the shockwave being driven by the chemical reaction may be directed and/or focused onto the first frame member 108 and/or the second frame member 110.

While force generator(s) 120 utilizing explosives to direct forces onto, and induce buckling of, the first frame member 108 and the second frame member 110 are disclosed, alternative force generation techniques are contemplated.

Figure 4:
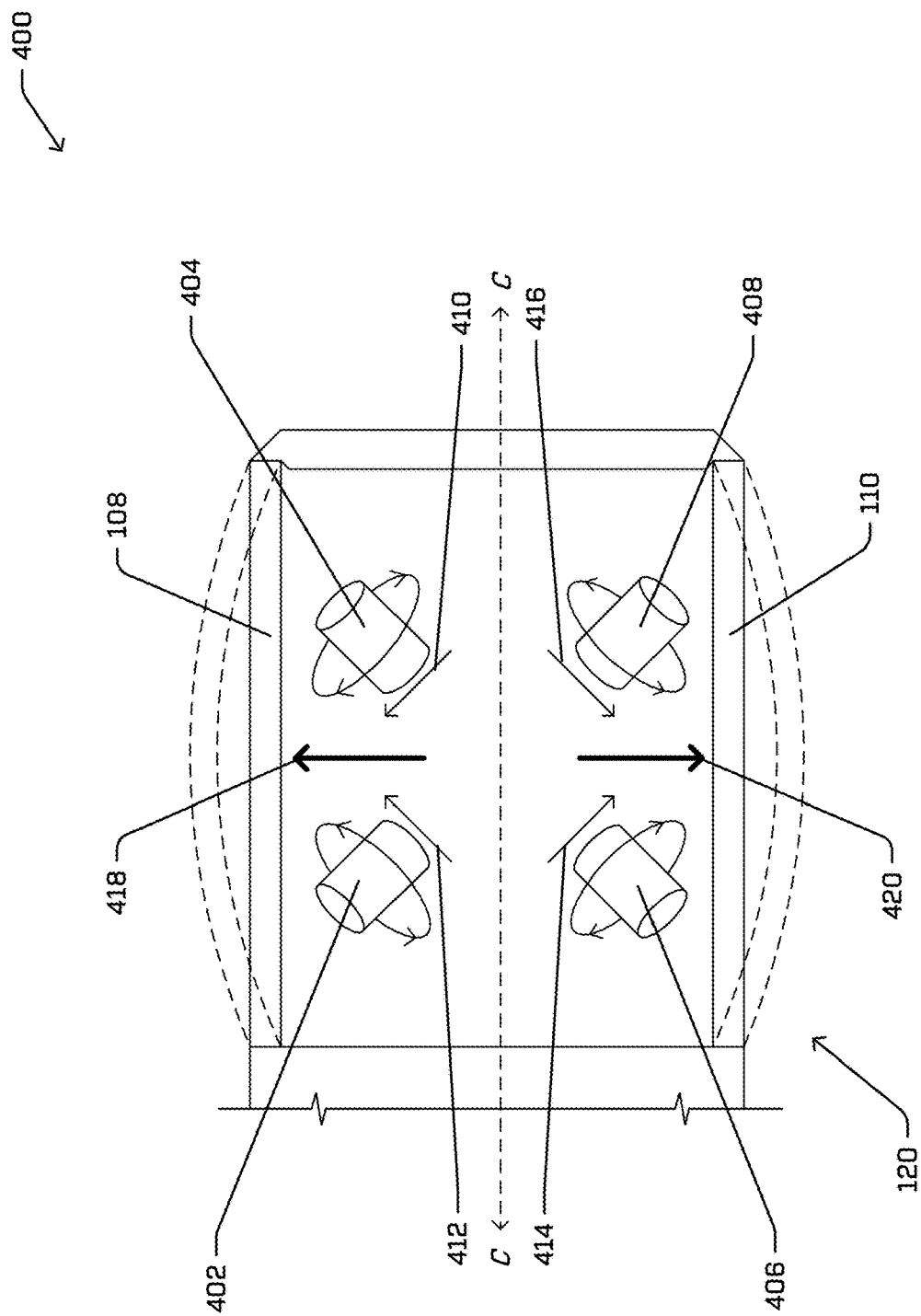
FIG. 4 is a top view of the vehicle frame illustrating another example force generator according to aspects of this disclosure.

FIG. 4 shows an example frame 400 and accompanying force generators 120 that are configured to generate electromagnetic forces (EMF) to induce buckling at the first frame member 108 and/or the second frame member 110. For example, the force generators 120, as illustrated, may include a first electromagnetic conductor (EMC) 402, a second EMC 404, a third EMC 406, and a fourth EMC 408. The EMF generated by Faraday's law of induction is due to relative movement of a circuit and a magnetic field and is the phenomenon underlying electrical generators. When a permanent magnet is moved relative to a conductor, or vice versa, EMF are created. If a wire is connected through an electrical load, current may flow, and electrical energy may be generated, converting mechanical energy of motion to electrical energy. For example, the force generator(s) 120 may be a drum generator which may generate the EMF through mechanical motion energy.

The first EMC 402 may generate a magnetic field (e.g., force) illustrated as a first force 410, as described above. Additionally, the second EMC 404 may generate a second force 412, the third EMC 406 may generate a third force 414, and the fourth EMC 408 may generate a fourth force 416. The first force 410 and the second force 412 may combine to generate a first applied force 418. Additionally, the third force 414 and the fourth force 416 may combine to generate a second applied force 420. The force generator(s) 120 may further apply the first applied force 418 and the second applied force 420 to the first frame member 108 and the second frame member 110, respectively, to induce buckling.

In some other instances, the force generator(s) 120 may be oriented at an angle and have alternating rotations. For example, the first EMC 402 may be placed at an angle of 45 degrees from parallel with the first longitudinal frame member 108 and with a counterclockwise rotation. Additionally, the second EMC 404 may similarly be placed at an angle of 45 degrees from parallel with the first longitudinal frame member 108 and with a clockwise rotation. In such instances, the 45-degree angle of the first EMC 402 and the second EMC 404 may produce the first force 410 and the second force 412, respectively, perpendicularly from the angle of rotation. As such, the first force 410 and the second force 412 may yield vector components that may further be combined to form the first applied force 418 on the first longitudinal frame member 108. Similarly, the third EMC 406 and the fourth EMC 408 may be configured in the same and/or similar way and may yield similar effects to form the second applied force 420 acting upon the second frame member 110.

In some instances, the force generator(s) 120 may be oriented between 0-90 degrees from parallel with the first frame member 108 and the second frame member 110, respectively. In some further instances, the force generator(s) 120 may be oriented between 30-60 degrees from parallel with the first frame member 108 and the second frame member 110, respectively. In some other instances, the force generator(s) 120 may be oriented between 40-50 degrees from parallel with the first frame member 108 and the second frame member 110, respectively. In some instances, the force generator(s) 120 may rotate at varying speeds to induce varying applied forces. For example, the active buckling control system 132 may determine speeds associated with a collision event. As such, the force generator controller 140 may increase or decrease the rotation of the force generator(s) 120 to generate greater or smaller applied forces on the frame 400.

In addition to EMF generation to induce buckling in the first frame member 108 and/or the second frame member 110, a hybrid electrochemical-mechanical aspect may be considered as an additional approach.

Figure 5:
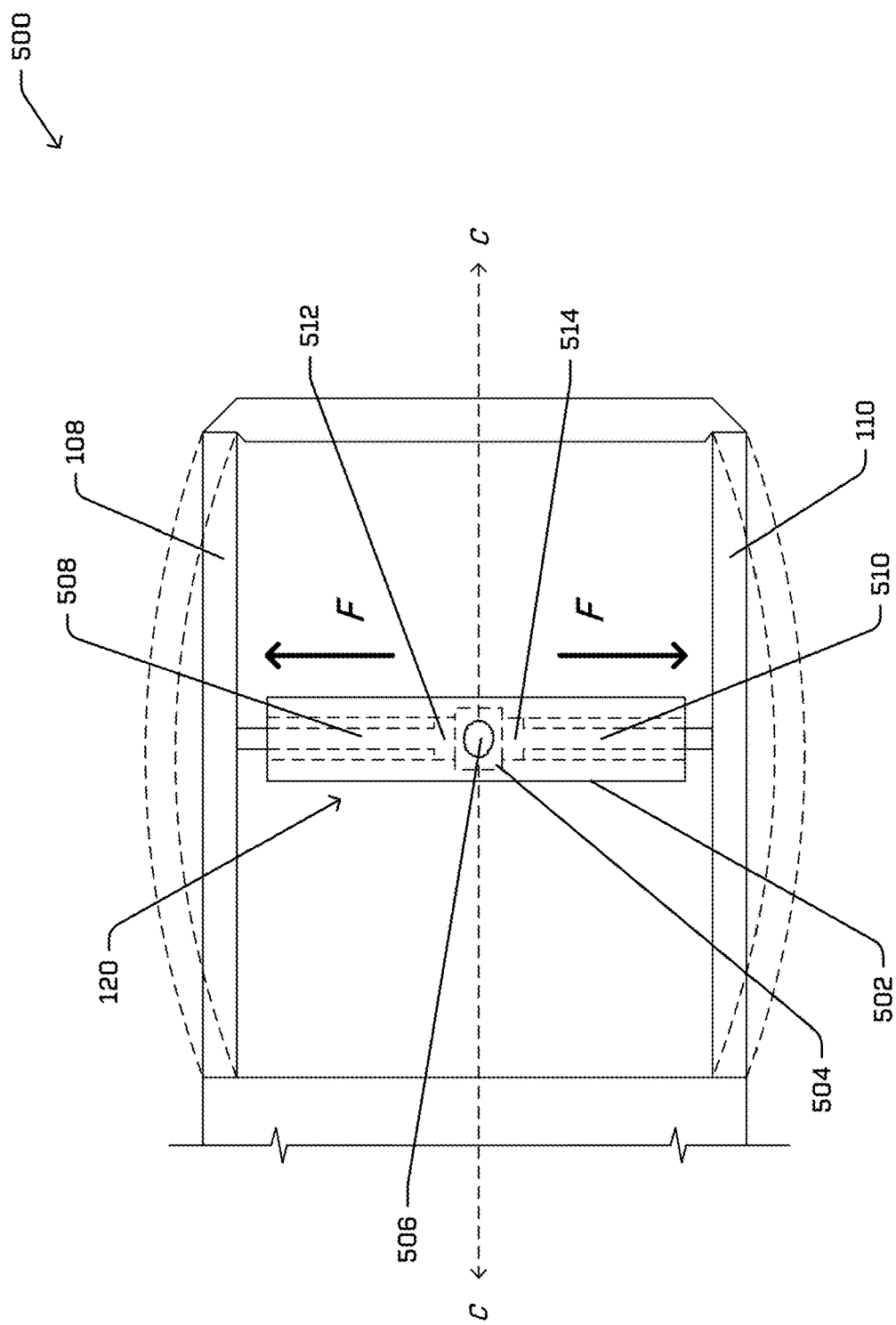
FIG. 5 is a top view of the vehicle frame illustrating another example force generator according to aspects of this disclosure.

In the example of FIG. 5, an example frame 500 is shown with the force generators 120 generating hybrid electrochemical-mechanical forces to apply to the first frame member 108 and the second frame member 110. For example, the force generators 120 may include a housing 502 defining a blast chamber 504. The blast chamber 504 may accommodate a controlled explosion 506, e.g., a squib, a detonator, or other pyrotechnic charge. The blast chamber 504 may facilitate a chemical detonation and/or explosion through the controlled explosion 506. In such examples, an expansion of high-temperature and high-pressure gases, produced by the controlled explosion 506 in the blast chamber 504, may apply direct forces in isolation or to some component(s). For example, the blast chamber may facilitate the controlled explosion 506 and direct a force, e.g., F, in a first direction and the force, F, in a second direction, opposite the first direction, through the housing 502, into the first longitudinal frame member 108 and the second longitudinal frame member 110, respectively, to induce buckling. This direct force may further move a component over a distance, transforming chemical energy into kinetic energy which is used to directly strike and/or pressurize, propel, move or power whatever the direct forces are applied to.

The housing may further include a first arm 508 and a second arm 510. The controlled explosion in the blast chamber 504 may generate forces which may be directed into the first arm 508 and the second arm 510. For example, the first arm may have a first flange 512 and the second arm 510 may have a second flange 514. The first flange 512 and the second flange 514 may seal the blast chamber 504 from the rest of the housing 502 which is hollow to reduce energy losses in any generated forces. As such, forces associated with the controlled explosion 506 may propagate outward and transfer into the first flange 512 of the first arm 508 and the second flange 514 of the second arm 510. The first arm 508 and the second arm 510 may then travel away from the controlled explosion 506, within the housing 502, and strike and/or apply the force, F, in the first direction and the second direction to the first frame member 108 and the second frame member 110, respectively.

While the force generator(s) 120 is illustrated as one device, it is contemplated that it may be one or more devices. Further, as illustrated, the force generator(s) 120 are shown to be located proximate centers of the first frame member 108 and the second frame member 110. It should be appreciated that the force generator(s) 120 may be placed along any point of the first longitudinal frame member 108 and/or the second longitudinal frame member 110. Additional aspects of this design are contemplated and more may be appreciated by one skilled in the art in light of this disclosure. This disclosure is merely exemplary of one possible illustration and should not be construed as limiting.

In the examples of FIGS. 3, 4, and 5, the force generator(s) are activated to induce a first force 122 and a second force 124 on the frame 104 which may, in combination with the collision force 118 and/or in isolation, cause the first frame member 108 and the second frame member 110 to bend and/or buckle. Additionally, the aspects of FIGS. 3, 4, and 5 may benefit from a frame 104 that is structurally uncompromised prior to activation of the force generator(s) 120. As such, the frame 104 may maintain greater structural integrity under certain conditions. For example, there may be certain conditions where activation of the force generator(s) 120 is not required and/or undesirable. As such, the frame 104 may maintain its structural integrity to resist any collision forces 118 under such circumstances. However, aspects of this disclosure contemplate activating the force generator(s) 120 to induce bending and/or buckling of the first frame member 108 and the second frame member 110 of the frame 104 in alternative ways.

Figure 6:
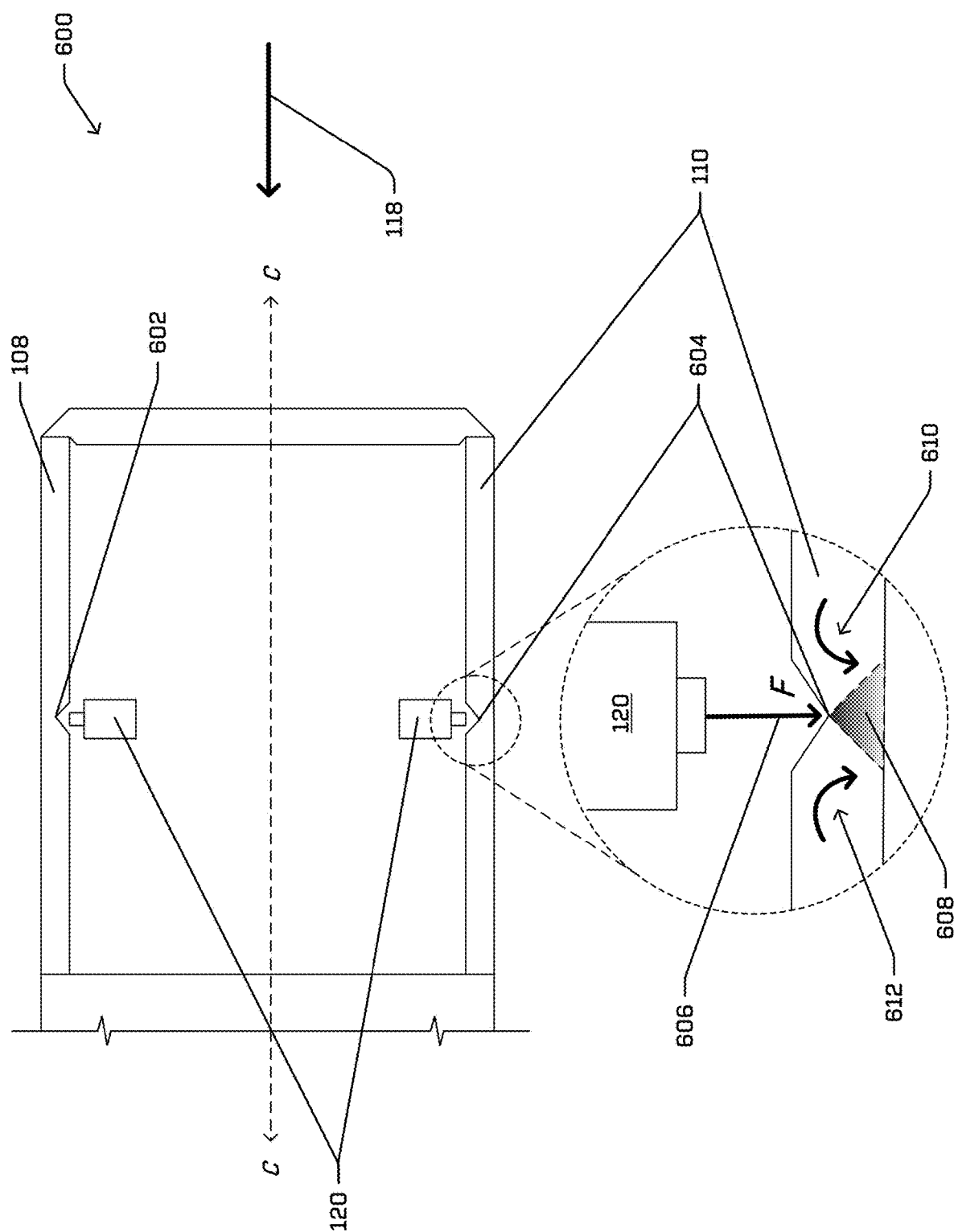
FIG. 6 is a top view of the vehicle frame illustrating an example buckling technique of the active buckling system according to aspects of this disclosure.

FIG. 6 shows an alternative example in which the frame 104 includes a structural compromise to further induce bending. In more detail, FIG. 6 shows a structural compromise where the force generator(s) 120 may apply the first force 122 and the second force 124. As such, the structural compromise may be configured such that a reduced force may achieve the same and/or similar effect of inducing bending and/or buckling as a greater force applied to the first frame member 108 and the second frame member 110 without the structural compromise.

In the example of FIG. 6, a frame 600 includes a first weakened portion 602 on the first longitudinal frame member 108 and a second weakened portion 604 on the second longitudinal frame member 110. The first weakened portion 602 and the second weakened portion 604 may be notches or some other alteration to a cross-section of the longitudinal frame members 108, 110. The notches may include holes, grooves, slots, and/or other cross-sectional variations. Notches result in uneven stress distribution, leading to stress peaks—known as a notch effect. The notch effect reduces the allowable load from the Euler formula which may induce buckling of the first longitudinal frame member 108 and the second longitudinal frame member 110 under reduced forces associated with a collision event. Accordingly, or alternatively, the first weakened portion 602 and the second weakened portion 604 may include heat treatment induced weaknesses. For example, the first frame member 108 and the second frame member 110 may be annealed in a particular location, the particular location becoming the first weakened portion 602 and the second weakened portion 604. Annealing may be understood as a heat treatment process used to increase ductility and reduce hardness of a material. As such, increased ductility in the first weakened portion 602 and the second weakened portion 604 may allow material crystals in those locations to move more easily and dissipate stress (e.g., forces) through plastic deformation which may more easily induce buckling. Alternatively, a remainder of the first frame member 108 and the second frame member 110 may maintain its hardness which may resist stress dissipation of stress which may result in transference of stresses into the first weakened portion 602 and the second weakened portion 604, respectively.

As illustrated in FIG. 6, the first weakened portion 602 and the second weakened portion 604 include notches. Referring to the second frame member 110, an exploded view illustrates an example application of how a force 606, via the force generator(s) 120, may be applied to the second weakened portion 604. As such, under the collision force 118, the second frame member 110 may form a stress concentration 608. The stress concentration 608 may, initially, form resulting from an angled force vector from the collision force 118 that runs along the second frame member 110 and is redirected at an angle commensurate with an angle of the weakened portion 604. Further, the stress concentration may be exacerbated by the force 606 applied to the weakened portion 604 by the force generator(s) 120. For example, the force generator(s) 120 may apply the force 606 at a same and/or substantially similar time as an application of the collision force 118 on the second frame member 110. As such, buckling and/or bending may be induced in the second frame member 110. For example, a counterclockwise bending moment 610 may be formed to a right side of the force 606 and/or the stress concentration 608 location. Additionally, a clockwise bending moment 612 may be formed to a left side of the force 606 and/or the stress concentration 608 location. Taken together, the second frame member 110 may buckling and/or bend laterally under a combination of the collision force 118, the force 606, and/or the second weakened portion 604.

In some instances, the combination of the collision force 118, the force 606, and/or the second weakened portion 604 may reduce the force 606 needed to induce buckling of the second frame member 110. As described and alluded to herein, the second weakened portion 604 may reduce the allowable force to induce buckling of the second frame member 110. As such, any forces generated by the force generator(s) 120 may be reduced and achieve the same and/or similar results in inducing buckling. As contemplated by FIG. 6, the second weakened portion is illustrated as residing on an inside of the second frame member 110. It should be appreciated that the second weakened portion 604 may be located on any side of the second frame member 110 to achieve the same and/or similar effects. Additionally, the second weakened portion 604 is shown as being placed approximate a center of the second frame member 110. However, the second weakened portion 604 may further be placed along any location of the second frame member 110 as necessary to produce the same, similar, and/or different results. Further, FIG. 6 describes the second weakened portion 604 of the second frame member 110, but the description provided may apply the same and/or similarly to the first weakened portion 602 and/or the first frame member 108.

While varying aspects of inducing buckling on the first frame member 108 and the second frame member 110 have been described and alluded to above, a system may be included to activate and/or otherwise carry out inducing the buckling.

Figure 7:
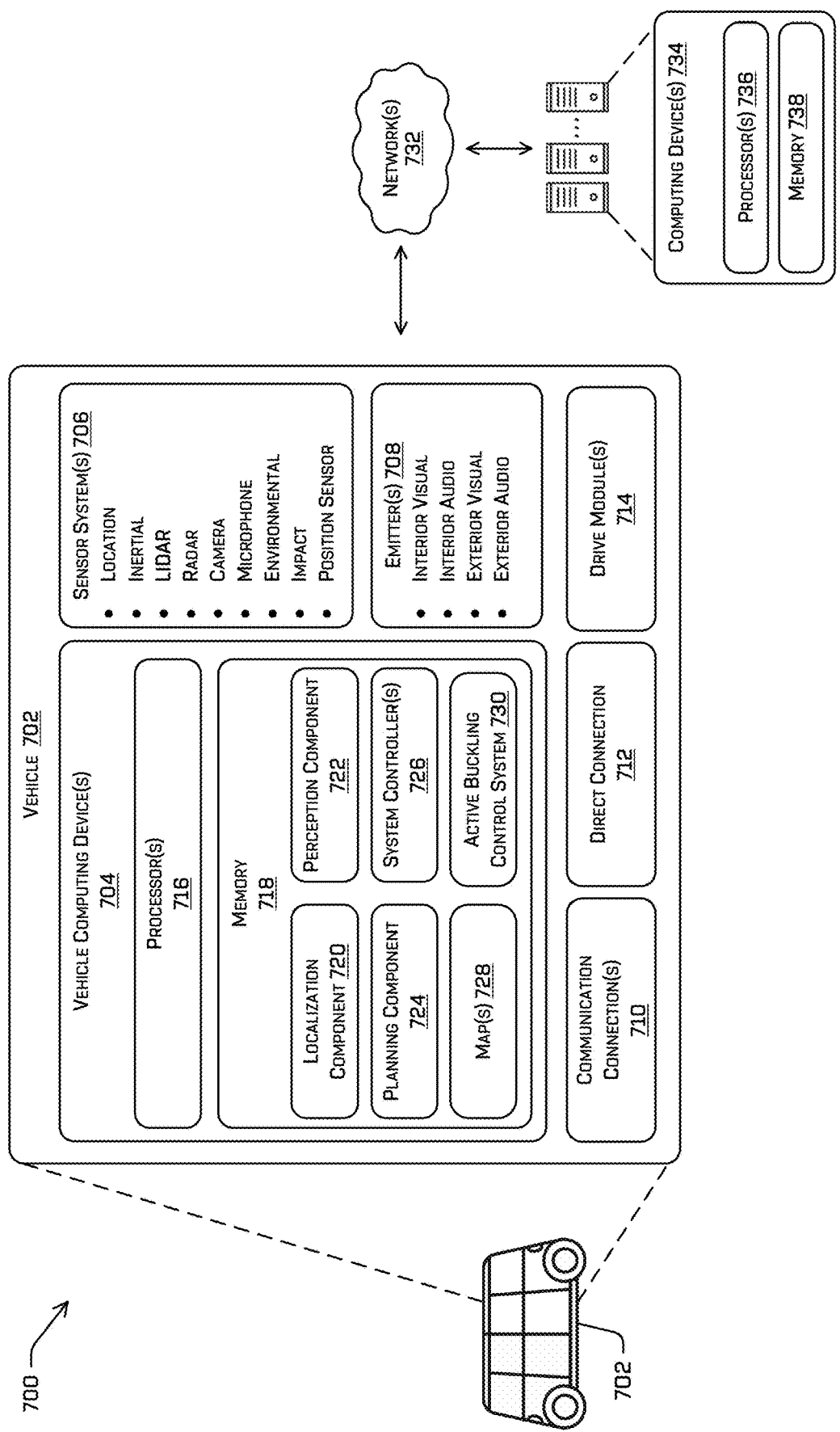
FIG. 7 is a block diagram of an example system architecture for implementing example techniques described herein.

FIG. 7 is a block diagram of an example system 700 illustrating an example architecture for implementing the example techniques described herein. In at least some examples, the system 700 may include a vehicle 702, which may correspond to the example vehicle 102 shown in FIG. 1. The vehicle 702 may include a vehicle computing device 704, one or more sensor system(s) 706, one or more emitters 708, one or more communication connection(s) 710, at least one direct connection 712, and one or more drive modules 714. The vehicle computing device 704 may include one or more processors 716 and memory 718 communicatively coupled with the one or more processors 716. In the illustrated example, the vehicle 702 is an autonomous vehicle. However, the vehicle 702 may be any other type of vehicle. In the illustrated example, the memory 718 of the vehicle computing device 704 stores a localization component 720, a perception component 722, a planning component 724, one or more system controllers 726, one or more map(s) 728, and an active buckling control system 730. Though depicted in FIG. 8 as residing in memory 718 for illustrative purposes, it is contemplated that the localization component 720, the perception component 722, the planning component 724, the one or more system controllers 726, the one or more maps 728, and the active buckling control system 730 may additionally, or alternatively, be accessible to the vehicle 702 (e.g., stored on, or otherwise accessible by, memory remote from the vehicle 702).

In some examples, the one or more of sensor system(s) 706, the localization component 720, the perception component 722, or the planning component 724 may generate one or more triggering signals due to a predicted collision or actual collision involving the vehicle 702. For example, one or more of the sensor system(s) 706 may generate one or more signals indicative of an object (e.g., another vehicle, a wall, a guardrail, a bridge support, a utility pole, and/or a pedestrian) and communicate the one or more signals to the perception component 722 and/or the planning component 724, which may predict a collision with an object in the environment through which the vehicle 702 is travelling. Use of the planning component 724 to generate one or more triggering signals due to a predicted collision or actual collision involving the vehicle 702 may be as a last option and/or after exhausting maneuvering away from the object or otherwise avoiding the object.

Figure 8:
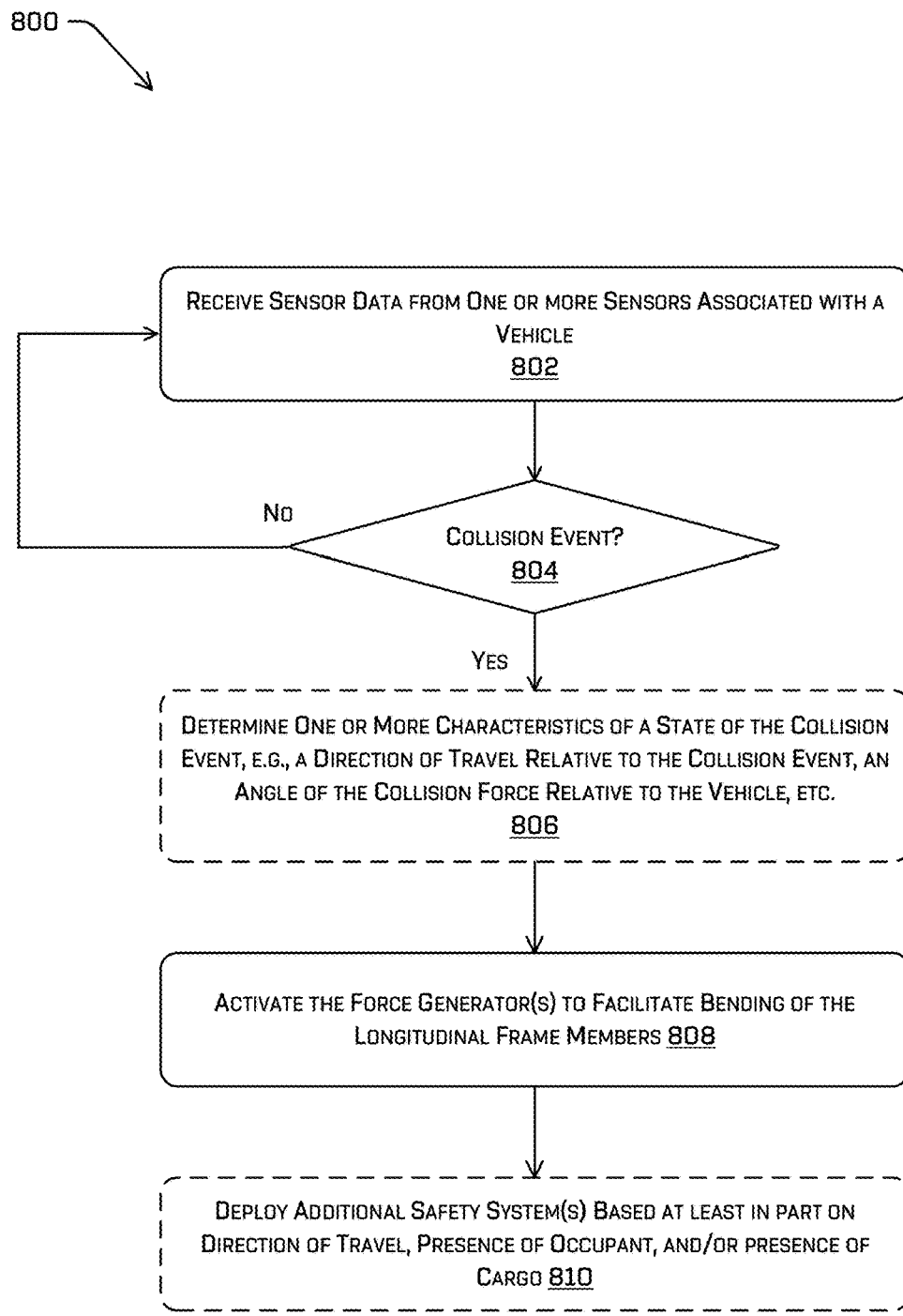
FIG. 8 is a flow diagram of an example process for implementing an active buckling system according to aspects of this disclosure.

Regarding the example system 700 shown in FIG. 8 in at least some examples, the localization component 720 may be configured to receive data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment and may continuously determine a location and/or orientation of the autonomous vehicle within the map. In some examples, the localization component 720 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 720 may provide data to various components of the vehicle 702 to determine an initial position of an autonomous vehicle for generating a candidate trajectory, as discussed herein.

In some examples, the perception component 722 may be configured to perform object detection, segmentation, and/or classification. In some examples, the perception component 722 may provide processed sensor data that indicates a presence of an entity that is proximate to the vehicle 702 and/or a classification of the entity as an entity type (e.g., car, pedestrian, cyclist, animal, building, tree, road surface, curb, sidewalk, unknown, etc.). In additional and/or alternative examples, the perception component 722 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 724 may determine a path for the vehicle 702 to follow to traverse through an environment. For example, the planning component 724 may determine various routes and trajectories and various levels of detail. For example, the planning component 724 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 724 may generate an instruction for guiding the autonomous vehicle along at least a portion of the route from the first location to the second location. In at least one example, the planning component 724 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 702 to navigate.

In at least one example, the planning component 724 may determine a location of a user based on image data of an environment received from the user using, for example, bags of binary words with image-based features, artificial neural network, and the like. Further, the planning component 724 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 702 may stop to pick up a passenger. In at least one example, the planning component 724 may determine a pickup location based at least in part on determining a user identity (e.g., determined via image recognition or received as an indication from a user device, as discussed herein).

The vehicle computing device 704 also includes the system controller(s) 726, which may be configured to control steering, propulsion, braking, safety, emitters, communication, and other systems of the vehicle 702. These system controller(s) 726 may communicate with and/or control corresponding systems of the drive module(s) 714 and/or other components of the vehicle 702.

The map(s) 728 may be used by the vehicle 702 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment and may be loaded into working memory as needed. In at least one example, the one or more maps 728 may include at least one map (e.g., images and/or a mesh). In some examples, the vehicle 702 may be controlled based at least in part on the maps 728. That is, the maps 728 may be used in connection with the localization component 720, the perception component 722, and/or the planning component 724 to determine a location of the vehicle 702, identify objects in an environment, and/or generate routes and/or trajectories to navigate within an environment.

In some examples, the one or more map(s) 728 may be stored on a remote computing device(s) (such as computing device(s) 734) accessible via one or more network(s) 732. In some examples, multiple maps 728 may be stored based on, for example, a characteristic (e.g., type of entity, time of day, day of week, season of the year, etc.). Storing multiple maps 728 may have similar memory requirements but increase the speed at which data in a map may be accessed.

The active buckling control system 730 may be the same as the active buckling control system 132 detailed above. For instance, and without limitation, the active buckling control system 730 can include functionality to determine a collision event, determine the presence of occupant(s) in the vehicle 702, and/or determine a direction of travel of the vehicle. Based at least in part on any of this information, all of this information, and/or any other information, the active buckling control system 730 can induce buckling in the frame 104, first frame member 108, and/or the second frame member 110 to reduce the time over which the vehicle 702 can absorb collision energy, e.g., to prevent injury to the occupant of the vehicle 702. Other functionality of the active buckling control system 730 is detailed further herein.

In some examples, aspects of some or all of the components discussed herein may include any models, algorithms, and/or machine learning algorithms. For example, in some examples, the components in the memory 718 and/or the memory 738 may be implemented as a neural network.

As described herein, an exemplary neural network is a biologically inspired algorithm which passes input data through a series of connected layers to produce an output. Each layer in a neural network may also include another neural network or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 706 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. Without limitation, the sensor system(s) 706 can include the sensors 130 discussed above. The sensor system(s) 706 may include multiple examples of each of these or other types of sensors. For example, the LIDAR sensors may include individual LIDAR sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally, or alternatively, the sensor system(s) 706 may send sensor data, via the one or more networks 732, to the one or more computing device(s) 734 at a particular frequency, after a lapse of a predetermined period of time, in near real-time, etc.

The emitter(s) 708 may be configured to emit light and/or sound. The emitters 708 in this example include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The communication connection(s) 710 enable communication between the vehicle 702 and one or more other local or remote computing device(s). For example, the communication connection(s) 710 may facilitate communication with other local computing device(s) on the vehicle 702 and/or the drive module(s) 714. Also, the communication connection(s) 710 may allow the vehicle 702 to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 may include physical and/or logical interfaces for connecting the vehicle computing device 704 to another computing device or a network, such as network(s) 732. For example, the communications connection(s) 710 may enable Wi-Fi-based communication, such as via frequencies defined by the IEEE 702.11 standards, short range wireless frequencies such as Bluetooth®, cellular communication (e.g., 2G, 3G, 4G, 4G LTE, 6G, etc.) or any suitable wired or wireless communications protocol that enables the respective computing device to interface with the other computing device(s).

In at least one example, the direct connection 712 may provide a physical interface to couple the one or more drive module(s) 714 with the body of the vehicle 702. For example, the direct connection 712 may allow the transfer of energy, fluids, air, data, etc. between the drive module(s) 714 and the vehicle 702. In some examples, the direct connection 712 may further releasably secure the drive module(s) 714 to the body of the vehicle 702.

In at least one example, the vehicle 702 may include the drive module(s) 714. In some examples, the vehicle 702 may have a single drive module 714. In at least one example, if the vehicle 702 has multiple drive modules 714, individual drive modules 714 may be positioned on opposite ends of the vehicle 702 (e.g., the leading end and the rear, etc.). In at least one example, the drive module(s) 714 may include one or more sensor systems to detect conditions of the drive module(s) 714 and/or the surroundings of the vehicle 702. By way of example and not limitation, the sensor system(s) 706 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 714. In some cases, the sensor system(s) on the drive module(s) 714 may overlap or supplement corresponding systems of the vehicle 702 (e.g., sensor system(s) 706).

The drive module(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 714 may include a drive module controller, which may receive and preprocess data from the sensor system(s) 706 and to control operation of the various vehicle systems. In some examples, the drive module controller may include one or more processors and memory communicatively coupled with the one or more processors. The memory may store one or more modules to perform various functionalities of the drive module(s) 714. Furthermore, the drive module(s) 714 also include one or more communication connection(s) that enable communication by the respective drive module with one or more other local or remote computing device(s).

In at least one example, the localization component 720, perception component 722, the planning component 724, and/or the active buckling control system 730 may process sensor data, as described above, and may send their respective outputs, over the one or more network(s) 732, to one or more computing device(s) 734. In at least one example, the localization component 720, the perception component 722, the planning component 724, and/or the active buckling control system 730 may send their respective outputs to the one or more computing device(s) 734 at a particular frequency, after a lapse of a predetermined period of time, in near real-time, etc.

The processor(s) 716 of the vehicle 702 and/or the processor(s) 736 of the computing device(s) 734 may include any suitable processor capable of executing instructions to process data and perform operations as described herein. By way of example and not limitation, the processor(s) 716, 736 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and 738 are examples of non-transitory computer-readable media. The memory 718 and 738 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual members described herein may include many other logical, programmatic, and physical components, of which those shown in the accompanying figures are merely examples that are related to the discussion herein.

It should be noted that while FIG. 8 is illustrated as a distributed system, in alternative examples, components of the vehicle 702 may be associated with the computing device(s) 734, and/or components of the computing device (s) 734 may be associated with the vehicle 702. That is, the vehicle 702 may perform one or more of the functions associated with the computing device(s) 734 and vice versa.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art may appreciate that the example system 700 shown in FIG. 8 is merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The system 700 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art may also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the system 700 as illustrated. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the system 700 may be transmitted to the system 700 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 102 is discussed below.

FIG. 8 is a flow diagram of an example process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

More specifically, FIG. 8 is a flow diagram of an example process 800 for inducing bending and/or buckling of the frame 104. At an operation 802, the process 800 includes receiving sensor data from one or more sensors associated with a vehicle. For example, the sensors can include the sensor system(s) 706, the sensors 130 (e.g., occupant detection and/or cargo detection sensors) and/or any other sensors that generate sensor data associated with a vehicle. Without limitation, the sensors from which data is received at the operation 802 can include location sensors, position sensors, proximity sensors, inertial sensors, LIDAR sensors, camera sensors, microphone sensors, environmental sensors, impact sensors, and/or other sensor modalities.

At an operation 804, the process 800 includes determining whether a collision event exists. For example, the operation 804 can include determining, based at least in part on the sensor data received at 802 that the vehicle has been involved in a collision, or that a collision is imminent. As stated above, vehicle 102 may utilize sensor data such a LIDAR information to determine the surroundings of the environment around 102. Such surroundings may contain obstacles, objects, people, other vehicles, among other things. The systems may receive the sensor information and make a determination, with prediction algorithms, such as machine learning models, and determine that there may be a collision of an imminent collision involving the vehicle 102.

If, at the operation 804 it is determined that there is not a collision event (a "No" at operation 804), the process 800 may return to operation 802. As such, the process 800 may iteratively processes the sensor data received at operation 802 until a collision event is determined.

If, at the operation 804 it is determined that the there is a collision event (a "Yes" at operation 804), the process 800 may proceed to operation 806.

At an operation 806, the process 800 optionally includes determining one or more characteristics of a state of the collision event. For example, as discussed above, the vehicle 102 may move in a bidirectional manner. As such, any frame 104, depending on the direction of travel, may be facing an imminent and/or experiencing the collision force 118. In further aspects, the process 800 may include determining an angle of the collision force 118. For example, the process 800 may determine the angle of the collision force 118 and/or characteristics associated with the angle of the collision force 118 including relative force magnitudes to be experienced in the longitudinal frame members 108 and 110, timings associated with application of the relative force magnitudes as they are experienced, and/or the like. In other aspects, the process 800 may include determining a location of impact of the collision force 118 and/or any associated characteristics. For example, the process 800 may determine the location of impact of the collision force 118 and associated characteristics including, magnitudes of the collision force 118 in the longitudinal frame members 108 and 110, timings associated with application of the relative force magnitudes as they are experienced, and/or the like. For example, the operation 804 may also be carried out and/or assisted by the direction detection component 138 discussed above. Additionally, further components may be used including the perception component 722, the planning component 724, the active buckling control system 730, etc.

At an operation 808, the process 800 includes activating the force generators 120. For example, as the vehicle 102 may move in a bidirectional manner, the frame 104 may include a first frame on a first end of the vehicle 102 and a second frame on a second end of the vehicle 102, while the first frame and the second frame may have their own respective force generator(s) 120. As such, the process 800 may determine the direction of the collision event, as described and alluded to herein, and may activate the appropriate force generator(s) 120. Activation of the force generator(s) 120 may, in combination with and/or in isolation, induce the frame 104 to bend and/or buckle. As such, the frame 104 may absorb more of the collision force 118, increase the time over which the collision force 118 may be absorbed, and/or the like. Further, activation of the force generator(s) 120 may provide protection to any occupants and/or reduce any damages to the vehicle 102. Other scenarios for activating the force generator(s) 120 are detailed herein, and still others can be appreciated by those having ordinary skill in the art, with the benefit of this disclosure.

At an operation 810, the process 800 may optionally include deploying additional safety system(s) of the vehicle 102 such as to deploy one or more airbags and/or one or more barriers based at least in part on the direction of travel, the presence of the occupant(s), and/or the presence of the cargo.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art may recognize that other implementations may be performed in combination with other types of program modules. Generally, program modules include routines, programs, components, data structures, and other types of structures that perform particular tasks or implement particular abstract data types.

Those skilled in the art may also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for activating an active buckling system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

Example Clauses

A. An example vehicle includes: a passenger compartment; a frame including a first frame member and a second frame member, the first frame member and the second frame member extending along a longitudinal direction of the vehicle away from the passenger compartment and being spaced from each other in a lateral direction; an extent of the first frame member and the second frame member in the longitudinal direction defining, at least in part, an overhang area at an end of the vehicle; a first force generator associated with the first frame member and configured to apply a first force to the first frame member to configure the first frame member to more easily deflect in a lateral direction away from the second frame member, upon application of a force resulting from a collision event; a second force generator associated with the second frame member and configured to apply a second force to the second frame member to configure the second frame member to more easily deflect in a lateral direction away from the first frame member, upon application of the force resulting from the collision event; and a controller configured to: receive sensor data associated with an environment of the vehicle; determine, based at least in part on the sensor data, that the collision event is proximate an overhang area of the vehicle; and activate the first force generator and the second force generator in response to the collision event.

B. The vehicle of example A, wherein at least one of: the first force generator comprises a first explosive charge configured to generate the first force in response to detonation of the first explosive charge; or the second force generator comprises a second explosive charge configured to generate the second force in response to detonation of the second explosive charge and in response to the collision event.

C. The vehicle of example A or example B, wherein at least one of: the first force generator comprises a first electromagnetic inductor (EMI); or the second force generator comprises a second EMI.

D. The vehicle of any one of example A through example C, further comprising: the first force generator is configured to apply the first force proximate a first center, longitudinally, of the first frame member; and the second force generator is configured to apply the second force proximate a second center, longitudinally, of the second frame member.

E. The vehicle of any one of example A through example D, wherein the frame further comprises: a third frame member extending along a lateral direction of the vehicle; a first coupling, coupling the first frame member to the third frame member at a first front end of the first frame member; a second coupling, coupling the second frame member to the third frame member at a second front end of the second frame member; and wherein the first force generator is configured to apply the first force proximate the first coupling to at least partially destroy the first coupling; wherein the second force generator is configured to apply the second force proximate the second coupling to at least partially destroy the second coupling.

F. An example vehicle safety system, includes: a first member extending along a first direction in relation to a vehicle; a first force generator disposed proximate the first member, and wherein the first force generator is configured to selectively apply a first force to the first member, wherein application of the first force changes a state of the first member to more readily deflect in a second direction, oblique to the first direction, upon application of a collision force resulting from a collision event.

G. The vehicle safety system of example F, wherein the first member is disposed within an overhang portion of the vehicle.
H. The vehicle safety system of example F or example G, wherein the first force generator comprises: an explosive charge configured to apply the first force from a detonation of the explosive charge.
I. The vehicle safety system of any one of example F through example H, wherein the first force generator further comprises: a first mechanical device configured to mechanically transfer a first explosive force to the first member.
J. The vehicle safety system of any one of example F through example I, further comprising a second member extending along the first direction, parallel to the first member and spaced from the first member by a distance.
K. The vehicle safety system of any one of example F through example J, further comprising a second force generator, wherein the second force generator is configured to selectively apply a second force to the second member.
L. The vehicle safety system of any one of example F through example K, further comprising a controller configured to: receive sensor data associated with an environment of the vehicle proximate the first member and the second member; determine, based at least in part on the sensor data, a collision event; and activate the first force generator and the second force generator in response to the collision event.
M. The vehicle safety system of any one of example F through example L, wherein the controller is further configured to: determine a third force to be experienced in the first member; determine a fourth force to be experienced in the second member; adjust, based at least in part on the third force, the first force; and adjust, based at least in part on the fourth force, the second force.
N. The vehicle safety system of any one of example F through example M, wherein the controller is further configured to: determine a first time associated with a third force to be experienced by the first member; and determine a second time associated with a fourth force to be experienced by the second member, the second time being after the first time, wherein: to activate the first force generator comprises activating the first force generator at the first time; and to activate the second force generator comprises activating the second force generator at the second time.
O. The vehicle safety system of any one of example F through example N, wherein the controller is further configured to: determine, based at least in part on the sensor data, one or more characteristics of the collision event including a magnitude of a collision force, a location of the collision force, and an angle of the collision force, wherein at least one of the first force, the second force, a first timing associated with the first force, or a second timing associated with the second force is based, at least in part, on the one or more characteristics of the collision event.
P. The vehicle safety system of any one of example F through example O, wherein the vehicle safety system further comprises a weakened portion on the first member that weakens the first member.
Q. An example method includes: determining a collision event associated with a vehicle; activating a first force generator to apply a first force to a first longitudinally-extending member of the vehicle to change a first state of the first longitudinally-extending member to more readily deflect in a first lateral direction; and activating a second force generator to apply a second force to a second longitudinally-extending member of the vehicle to change a second state of the second longitudinally-extending member to more readily deflect in a second lateral direction, the second lateral direction opposite of the first lateral direction.
R. The method of example Q, further comprising: receiving sensor data associated with an environment of the vehicle proximate the first longitudinally-extending member and the second longitudinally-extending member; determining, based at least in part on the sensor data, an angle of attack of a collision force associated with the collision event; determining, based at least in part on the angle of attack, a third force to be experienced by the first longitudinally-extending member; and determining, based at least in part on the angle of attack, a fourth force to be experienced by the second longitudinally-extending member, the fourth force being lesser in magnitude than the third force; wherein the first force generated by the first force generator is based at least in part on the angle of attack or the third force, and wherein the second force generated by the second force generator is based at least in part on the angle of attack of the fourth force.
S. The method of example Q or example R, further comprising: determining, based at least in part on the sensor data, a location of the collision force, associated with the collision event, on the vehicle; wherein the first force and the second force are based at least in part on the location of the collision force.
T. The method of any one of example Q through example S, further comprising: determining, based at least in part on the sensor data, a first time associated with activating the first force generator; and determining, based at least in part on the sensor data, a second time associated with activating the second force generator, wherein the first time is before the second time.

What is claimed is:

1. A vehicle safety system, comprising:
   a first member extending along a first direction in relation to a vehicle; and
   a first force generator disposed proximate the first member, the first force generator including an electrochemical device,
   wherein the first force generator is configured to selectively apply a first force to the first member, and
   wherein application of the first force changes a state of the first member to more readily deflect in a second direction, oblique to the first direction, upon application of a collision force resulting from a collision event.

2. The vehicle safety system of claim 1, wherein the first member is disposed within an overhang portion of the vehicle.

3. The vehicle safety system of claim 1, wherein the first force generator comprises:
   an explosive charge configured to apply the first force from a detonation of the explosive charge.

4. The vehicle safety system of claim 1, wherein the first force generator further comprises:
   a first mechanical device configured to mechanically transfer a first explosive force to the first member.

5. The vehicle safety system of claim 1, further comprising a second member extending along the first direction, parallel to the first member and spaced from the first member by a distance.

6. The vehicle safety system of claim 5, further comprising a second force generator, wherein the second force generator is configured to selectively apply a second force to the second member.

7. The vehicle safety system of claim 6, further comprising a controller configured to:
   receive sensor data associated with an environment of the vehicle proximate the first member and the second member;
   determine, based at least in part on the sensor data, a collision event; and
   activate the first force generator and the second force generator in response to the collision event.

8. The vehicle safety system of claim 7, wherein the controller is further configured to:
   determine a third force to be experienced in the first member;
   determine a fourth force to be experienced in the second member;
   adjust, based at least in part on the third force, the first force; and
   adjust, based at least in part on the fourth force, the second force.

9. The vehicle safety system of claim 7, wherein the controller is further configured to:
   determine a first time associated with a third force to be experienced by the first member; and
   determine a second time associated with a fourth force to be experienced by the second member, the second time being after the first time, wherein:
      activating the first force generator comprises activating the first force generator at the first time, and
      activating the second force generator comprises activating the second force generator at the second time.

10. The vehicle safety system of claim 7, wherein the controller is further configured to:
   determine, based at least in part on the sensor data, one or more characteristics of the collision event including a magnitude of a collision force, a location of the collision force, and an angle of the collision force,
   wherein at least one of the first force, the second force, a first timing associated with the first force, or a second timing associated with the second force is based, at least in part, on the one or more characteristics of the collision event.

11. The vehicle safety system of claim 1, wherein the vehicle safety system further comprises a weakened portion on the first member that weakens the first member.

* * * * *